(12) United States Patent
Tabata et al.

(10) Patent No.: US 8,033,939 B2
(45) Date of Patent: Oct. 11, 2011

(54) CONTROL APPARATUS OF VEHICLE DRIVE APPARATUS

(75) Inventors: Atsushi Tabata, Okazaki (JP); Tooru Matsubara, Toyota (JP); Tatsuya Imamura, Okazaki (JP); Yuji Iwase, Mishima (JP); Kenta Kumazaki, Toyota (JP); Keita Imai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 319 days.

(21) Appl. No.: 12/320,633

(22) Filed: Jan. 30, 2009

(65) Prior Publication Data

US 2009/0209382 A1    Aug. 20, 2009

(30) Foreign Application Priority Data

Feb. 18, 2008  (JP) .................. 2008-036527

(51) Int. Cl.
*F16H 3/72* (2006.01)
*F16H 37/06* (2006.01)
*B60W 10/02* (2006.01)

(52) U.S. Cl. ............................. 475/5; 477/5

(58) Field of Classification Search ...... 475/5, 208–210, 475/214; 477/3; 180/65.21, 65.225, 65.22, 180/65.23, 65.235, 65.24, 65.245, 65.25, 180/65.26

See application file for complete search history.

(56) References Cited

U.S. PATENT DOCUMENTS

| | | | |
|---|---|---|---|
| 6,244,368 B1 * | 6/2001 | Ando et al. ............... | 180/65.25 |
| 6,302,227 B1 * | 10/2001 | Takemura et al. ......... | 180/65.25 |
| 6,524,217 B1 * | 2/2003 | Murakami et al. ............... | 477/5 |
| 6,871,129 B2 * | 3/2005 | Kitaori et al. ................. | 701/51 |
| 7,066,860 B2 * | 6/2006 | Habuchi et al. ............... | 475/208 |
| 7,174,979 B2 * | 2/2007 | Ohta et al. .................. | 180/65.25 |
| 2007/0155583 A1 * | 7/2007 | Tabata et al. .................... | 477/37 |
| 2008/0076623 A1 * | 3/2008 | Tabata et al. .................... | 477/5 |
| 2008/0109139 A1 * | 5/2008 | Muta et al. .................... | 701/48 |
| 2008/0146408 A1 * | 6/2008 | Tabata et al. .................... | 477/35 |
| 2008/0153664 A1 * | 6/2008 | Tabata et al. .................... | 477/37 |

FOREIGN PATENT DOCUMENTS

| | | |
|---|---|---|
| JP | A-62-067361 | 3/1987 |
| JP | A-11-217025 | 8/1999 |
| JP | A-2005-264762 | 9/2005 |
| JP | A-2006-017199 | 1/2006 |
| JP | A-2006-273071 | 10/2006 |
| JP | A-2006-273305 | 10/2006 |
| JP | A-2007-118727 | 5/2007 |

* cited by examiner

*Primary Examiner* — Roger Pang
*Assistant Examiner* — Huan Le
(74) *Attorney, Agent, or Firm* — Oliff & Berridge, PLC

(57) ABSTRACT

In one embodiment, when a switching clutch or a switching brake is engaged and thus a differential of a differential unit is limited, the gear ratio of a continuously variable transmission unit is adjusted. On the other hand, when the switching clutch and the switching brake are both released and thus the differential of the differential unit is not limited, an overall gear ratio obtained from the gear ratio of the differential unit and the gear ratio of the continuously variable transmission unit is adjusted.

20 Claims, 20 Drawing Sheets

CONTROL APPARATUS OF VEHICLE DRIVE APPARATUS

CROSS-REFERENCE TO RELATED APPLICATION

This application claims priority under 35 U.S.C. §119(a) on Japanese Patent Application No. 2008-036527 filed in Japan on Feb. 18, 2008, the entire contents of which are herein incorporated by reference.

TECHNICAL FIELD

The present invention relates to a control apparatus of a vehicle drive apparatus mounted in a vehicle, and in particular relates to a measure for improving motive power transmission efficiency in a vehicle drive apparatus.

BACKGROUND ART

Recently, from the viewpoint of environmental protection and the like, reduction in the amount of exhaust gas emissions from an engine (internal combustion engine) mounted in a vehicle and improvement of specific fuel consumption have been sought, and as vehicles that satisfy these goals, hybrid vehicles equipped with a hybrid system have been put into practical use.

Such a hybrid vehicle is provided with an engine such as a gasoline engine, and an electric motor (for example, a motor generator) that, for example, assists engine output by driving (powering) the hybrid vehicle using electric power generated by engine output or electric power stored in a battery, and in this hybrid vehicle, either or both of the engine and electric motor are used as a running power source.

Also, as a drive apparatus of the hybrid system mounted in this type of hybrid vehicle, for example, there are the drive apparatuses disclosed in the documents below.

JP 2005-264762A (referred to below as Patent Document 1)

JP 2006-273305A (referred to below as Patent Document 2)

JP H11-217025A (referred to below as Patent Document 3)

The drive apparatuses disclosed in these Patent Documents 1 to 3 are provided with a power distribution mechanism that distributes engine output to a first electric motor and an output shaft, a second electric motor that is linked to the output shaft of that power distribution mechanism, and a transmission mechanism connected thereto on the subsequent stage side thereof. The power distribution mechanism is configured with, for example, a planetary gear apparatus so as to function as a differential mechanism, and due to differential operation of the power distribution mechanism, the major part of power from the engine is mechanically transmitted towards drive wheels, and the remaining part of power from the engine is electrically transmitted using an electrical path from the first electric motor to the second electric motor. Thus, the power distribution mechanism functions as a transmission (referred to below as an electric differential unit) in which the gear ratio is electrically changed, and allows the vehicle to be run while maintaining engine operation in a region of high combustion efficiency, thereby contributing to improved specific fuel consumption.

Also, as the transmission mechanism provided on the subsequent stage side, an automatic stepped transmission mechanism is applied in the drive apparatuses of Patent Documents 1 and 2, and a belt-driven continuously variable transmission mechanism is applied in the drive apparatus of Patent Document 3.

In view of increasing the practicality of a vehicle drive apparatus in which, as described above, the electric differential unit is provided on the previous stage side, and the transmission mechanism capable of changing the gear ratio is provided on the subsequent stage side, the inventors of the present invention investigated a technique for controlling differential operation of the electric differential unit and gearshift operation of the transmission mechanism.

The inventors found that in a drive apparatus in which an automatic stepped transmission mechanism is applied as the subsequent stage side transmission mechanism, as disclosed in Patent Documents 1 and 2, because the gear ratio of this subsequent stage side transmission mechanism can only change in steps, it is not possible to realize control whereby optimal specific fuel consumption is obtained at every vehicle speed.

More specifically, engine output power is distributed by the electric differential unit, and transmitted to the drive wheels via two paths: a mechanical path where the output is transmitted towards the drive wheels as mechanical energy, and the aforementioned electrical path where the output is converted to electric energy by the electricity generating function of the first electric motor, and that electric energy is converted to mechanical energy by the second electric motor.

Here, energy loss due to the energy conversion occurs in energy transmission by the electrical path. Therefore, in order to increase motive power transmission efficiency, it is preferable to bring the electrical path amount near '0', by, for example, setting the revolution speed of the first electric motor to approximately '0'.

However, when attempting to operate the engine along a combustion efficiency optimal line, which is a gathering of engine operation points that realizes optimal specific fuel consumption, the engine revolution speed does not change in equal proportion to the vehicle speed. Therefore, in a drive apparatus in which an automatic stepped transmission mechanism is applied as the subsequent stage side transmission mechanism, as disclosed in Patent Documents 1 and 2, the gear ratio of this subsequent stage side transmission mechanism can only change in steps, so when the engine is operated along the combustion efficiency optimal line, if an attempt is made to set the automatic stepped transmission mechanism to a predetermined gear relative to a particular vehicle speed, it may become necessary to rotate the first electric motor. That is, in response to the vehicle speed and the gear of the automatic stepped transmission mechanism, the revolution speed of the first electric motor deviates from '0', and thus the electrical path amount cannot be brought near '0'. As a result, it is not possible to set the motive power transmission efficiency to maximum efficiency in the vehicle drive apparatus, due to generation or increase of this electric path amount.

The inventors of the present invention found that in a drive apparatus in which an automatic stepped transmission mechanism is applied as the subsequent stage side transmission mechanism, as described above, it is not possible to realize control whereby optimal specific fuel consumption is obtained at every vehicle speed. Such findings are not commonly known.

On the other hand, in Patent Document 3, although a belt-driven continuously variable transmission mechanism is applied as the subsequent stage side transmission mechanism, nothing is disclosed with respect to a control technique for the differential operation of the electric differential unit and the gearshift operation of the transmission mechanism, i.e., the technique for overall control of the gearshift operation for the vehicle drive apparatus as a whole, and Patent Document 3 does not propose a control technique that is specific to the case where a belt-driven continuously variable transmission mechanism is applied to the subsequent stage side.

SUMMARY OF THE INVENTION

The present invention provides, in a vehicle drive apparatus having a differential mechanism capable of differential operation and a continuously variable transmission unit capable of continuously variable gearshifting, a control apparatus of that vehicle drive apparatus that can set motive power transmission efficiency to maximum efficiency by realizing overall control of gearshift operation for the vehicle drive apparatus as a whole.

The control apparatus of a vehicle drive apparatus of the invention includes: an electric differential unit in which a differential state between a number of revolutions of an input shaft and a number of revolutions of an output shaft is controlled by controlling an operation state of a first electric motor linked to a rotating element of a differential mechanism; a limited slip differential means that is capable of limiting the differential state of the differential mechanism; a motive power source linked to the input shaft; a continuously variable transmission unit that constitutes a part of a motive power transmission path; and a gear ratio adjusting means that, when a differential of the electric differential unit is limited by the limited slip differential means, sets an operation point of the motive power source by adjusting a gear ratio of the continuously variable transmission unit relative to a target output of the motive power source, and when the differential of the electric differential unit is not limited, sets the operation point of the motive power source by adjusting an overall gear ratio obtained from the gear ratio of the electric differential unit and the gear ratio of the continuously variable transmission unit relative to the target output of the motive power source.

Thus, it is possible to set gear ratios that provide high specific fuel consumption and high transmission efficiency respectively according to a case where the differential of the electric differential unit is limited, and a case where the differential is not limited.

The gear ratio adjusting means may adjust the gear ratio such that the operation point of the motive power source approximately conforms to a point at which specific fuel consumption is optimal.

Thus, it is possible to achieve a dramatic improvement in specific fuel consumption.

Also, a configuration may be adopted in which a second electric motor linked to the electric differential unit is further provided, and when the differential of the electric differential unit is limited, the target output of the motive power source is set assuming that electricity is generated by the second electric motor.

Accordingly, in a state without the electric path, it is possible to uniquely determine the gear ratio of the continuously variable transmission unit by determining the target output of the motive power source necessary for electricity generation with the second electric motor, and thus determining the operation point of the motive power source.

Also, a configuration may be adopted in which a second electric motor linked to the electric differential unit is further provided, and when the differential of the electric differential unit is not limited, the target output of the motive power source is set assuming that electricity is generated by the first electric motor and the second electric motor.

Accordingly, the respective gear ratios are determined in consideration of the efficiency of the electrical path and the first and second electric motors, and the total efficiency of the electric differential unit and the continuously variable transmission unit.

Also, a switching control means may be further provided that, based on a vehicle running condition, switches between a state that limits the differential of the electric differential unit and a state that does not limit the differential. Examples of the vehicle running condition in this case may include vehicle speed and accelerator opening degree.

When the switching is performed based on vehicle speed, transmission efficiency can be improved due to reducing the electrical path amount. When the switching is performed based on accelerator opening degree, the size of the first electric motor can be reduced by limiting the torque direction.

Also, a configuration may be adopted whereby, as the state in which the differential of the electric differential unit is limited by the limited slip differential means, it is possible to switch between two states, low and high, that have a different gear ratio of the electric differential unit.

With this configuration, it is possible to attain both motive power properties and specific fuel consumption properties, and it is possible to insure a wide overall gear ratio of the drive apparatus. Conversely stated, it is possible to set a comparatively small width for the gear ratio of the continuously variable transmission unit.

Also, in this case, the low/high switching of the differential limiting state of the electric differential unit may be performed by a low/high switching control means based on vehicle speed or accelerator opening degree.

When the low/high switching is performed based on vehicle speed, an improvement in specific fuel consumption properties can be achieved, and the total gear ratio can be set to a high gear ratio. On the other hand, when the low/high switching is performed based on accelerator opening degree, an improvement in motive power properties can be achieved, and the total gear ratio can be set to a low gear ratio.

Also, a configuration may be adopted in which an electric motor for generating running drive power is provided in the motive power transmission path, and when running by driving of only this electric motor, a state is established in which differential operation of the electric differential unit is possible.

With this configuration, the number of motive power source revolutions can be set to '0' using the electric differential unit.

Also, a configuration may be adopted in which the differential mechanism is configured from a planetary gear apparatus, and the electric differential unit includes an electric motor that is capable of transmitting motive power to one or more drive wheels.

Also, the gear ratio adjusting means, when limiting the differential of the electric differential unit, may change the gear ratio of the continuously variable transmission unit such that the overall gear ratio is not changed.

With this configuration, continuously variable gearshifting is attained with the continuously variable transmission unit even in a case where the differential of the electric differential unit is limited, so smooth gearshifting can be established.

More specifically, a configuration may be adopted whereby as the state in which the differential of the electric differential unit is limited by the limited slip differential means, it is possible to switch between two states, low and high, that have a different gear ratio of the electric differential unit, and when switching the differential limiting state of the electric differential unit to the low side, the gear ratio adjusting means sets the gear ratio of the continuously variable transmission unit to a small deceleration ratio relative to a maximum deceleration ratio.

Accordingly, in the region where the differential of the electric differential unit is limited, it is possible to use all of the gear ratio of the continuously variable transmission unit before the maximum deceleration ratio.

Conversely, when switching the differential limiting state of the electric differential unit to the high side, the gear ratio adjusting means may set the gear ratio of the continuously variable transmission unit to a large deceleration ratio relative to a minimum deceleration ratio.

Accordingly, in the region where the differential of the electric differential unit is limited, it is possible to use all of the gear ratio of the continuously variable transmission unit before the minimum deceleration ratio.

Also, a configuration may be adopted in which the gear ratio adjusting means, during the switching transition between the state that limits the differential of the electric differential unit and the state that does not limit the differential, changes the gear ratio of the electric differential unit and the gear ratio of the continuously variable transmission unit at approximately the same time, such that the number of revolutions of the motive power source does not change.

With this configuration, shocks caused by a change in the number of revolutions of the motive power source do not occur, so an improvement in drivability is achieved.

3, i.e., a control operation that determines the gear ratio of the continuously variable transmission unit according to the combustion system of the engine when the differential unit is in a differential state during engine running, in the third embodiment.

Figure 1:
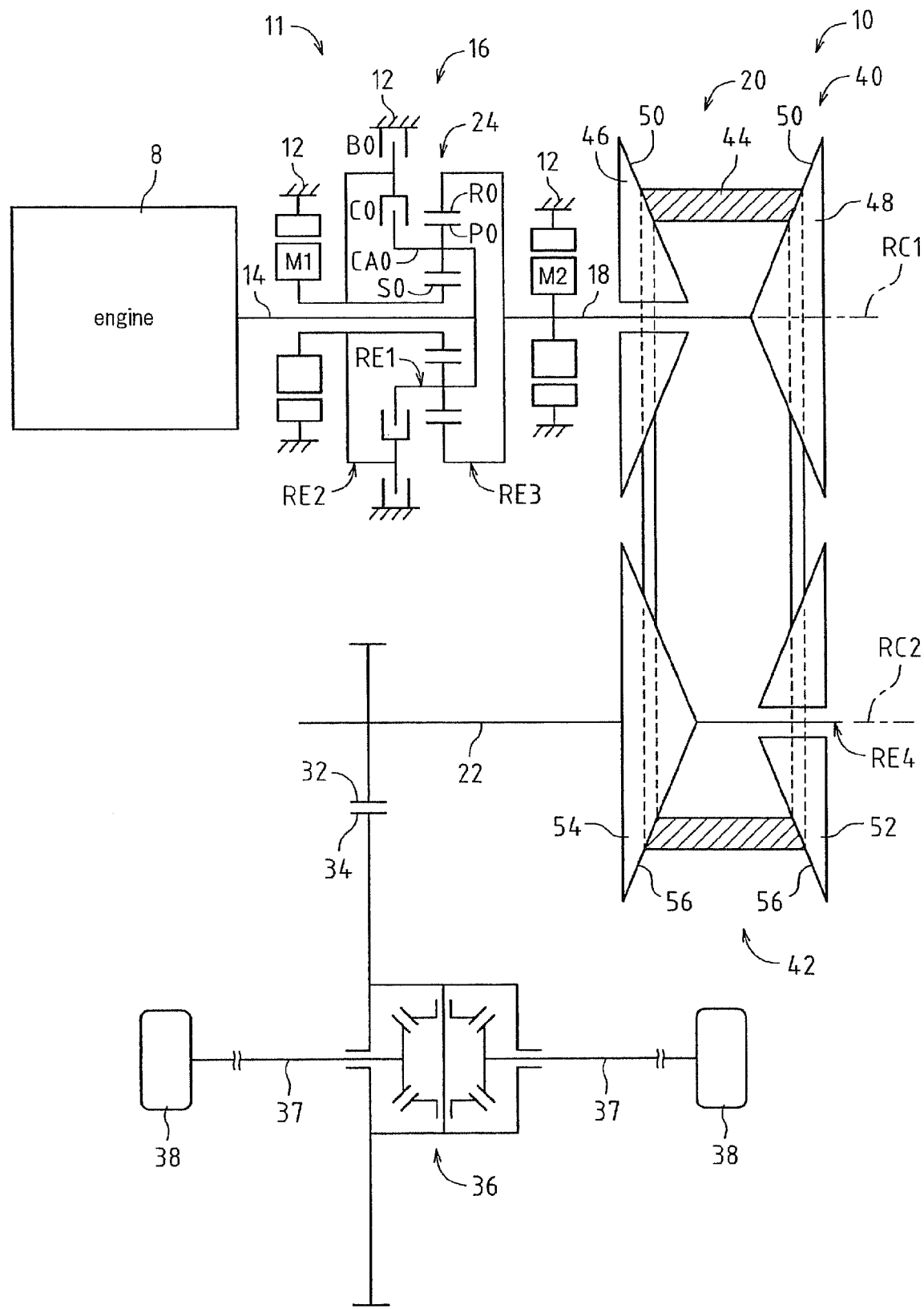
FIG. 1 is a skeleton view that illustrates the configuration of a hybrid vehicle drive apparatus in which a control apparatus of the invention is applied.
Figure 25:
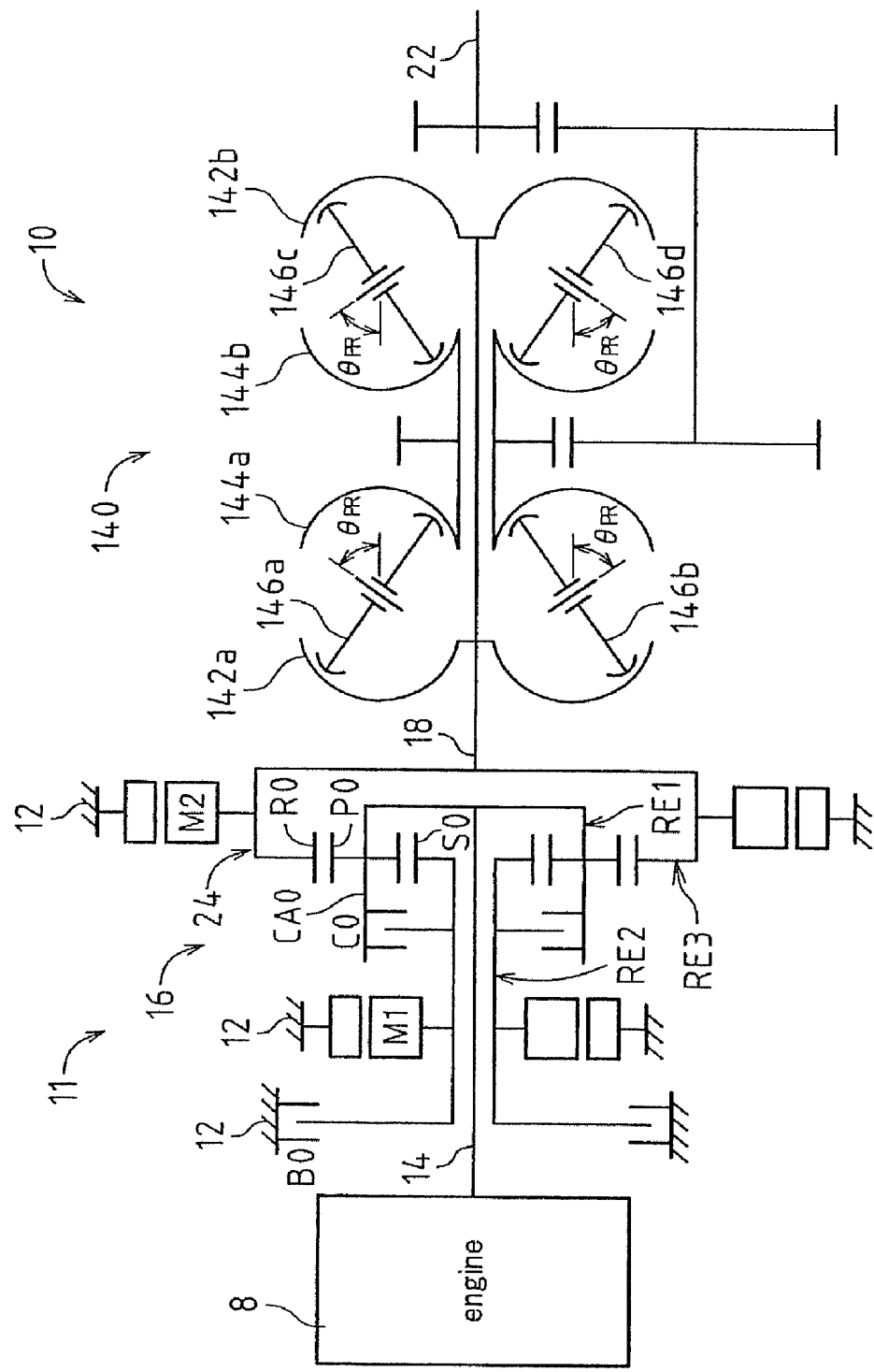

FIG. 25 is a skeleton view of a fourth embodiment, in which the continuously variable transmission unit of the hybrid vehicle drive apparatus in FIG. 1 is replaced by a continuously variable transmission unit having a different structure.

BEST MODE FOR CARRYING OUT THE INVENTION

Hereinafter, embodiments of the present invention will be described with reference to the accompanying drawings.

First Embodiment

In the present embodiment, a case will be described in which the invention is applied as a vehicle drive apparatus mounted in a hybrid vehicle that is provided with two motor/generators, and is configured as an FF (front engine/front drive) vehicle.
<Overall Configuration of Hybrid System>

FIG. 1 is a skeleton view that shows a vehicle drive apparatus 10 (referred to below as simply a drive apparatus) that constitutes a hybrid system mounted in a hybrid vehicle according to the present embodiment.

In FIG. 1, the drive apparatus 10 is provided with an input shaft 14 serving as an input rotation member, a differential unit 11 linked to the input shaft 14 directly or via an unshown pulse-absorbing damper (vibration damping apparatus), and a transmission member 18, which is an output rotation member of the differential unit 11, disposed in order on a first axis RC1 in a transmission case 12 (below, referred to as a 'case 12'). Further, the drive apparatus 10 is provided with a mechanical continuously variable transmission unit 20 (below, referred to as simply a 'continuously variable transmission unit 20') that is linked to the transmission member 18, constitutes a portion of a motive power transmission path between the differential unit 11 and drive wheels 38, and links the first axis RC1 to a second axis RC2 parallel to the first axis RC1 such that power can be transmitted between them, and an output shaft 22 that is disposed on the second axis RC2 and is a counter shaft linked to an output side of the continuously variable transmission unit 20.

Further, the drive apparatus 10 transmits power from an engine 8, which is an internal combustion engine such as a gasoline engine or a diesel engine, serving as a running drive power source (motive power source), and is linked to the input shaft 14 directly or via an unshown pulse-absorbing damper, to left and right drive wheels 38. That power is transmitted to the drive wheels 38 sequentially via a differential drive gear 32 linked to the output side of the continuously variable transmission unit 20 via an output shaft 22, a differential gear apparatus (final drive) 36 that has a differential ring gear 34 that engages with the differential drive gear 32, and a pair of vehicle axles 37, for example.
—Differential Unit 11—

The differential unit 11, which corresponds to the electric differential unit of the invention, is provided with a first electric motor M1, a power distribution mechanism 16, and a second electric motor M2 provided so as to rotate together with the transmission member 18. The power distribution mechanism 16 is a mechanical mechanism that mechanically distributes output of the engine 8 that has been input to the input shaft 14, and serves as a differential mechanism that distributes the output of the engine 8 to the first electric motor M1 and the transmission member 18. The first electric motor M1 and the second electric motor M2 are so-called motor/generators that have both a motor (electric motor) function and an electricity generation function. The first electric motor M1, which is a differential electrical motor, is provided with at least a generator (electricity generation) function for producing reactive force, and the second electric motor M2, which is a running electric motor, is provided with at least a motor (electric motor) function for outputting drive power as a running drive power source.

The power distribution mechanism 16, which corresponds to the differential mechanism of the invention, is mainly provided with a single pinion-type differential unit planetary gear apparatus 24 that, for example, has a predetermined gear ratio ρ0 of about '0.436', and a switching clutch C0 and a switching brake B0. The differential unit planetary gear apparatus 24 is provided with a differential unit sun gear S0, a differential unit planetary gear P0, a differential unit carrier CA0 that supports the differential unit planetary gear P0 so as to be capable of turning and revolving, and a differential unit ring gear R0 that engages with the differential unit sun gear S0 via the differential unit planetary gear P0, as rotating elements (elements). When the number of teeth of the differential unit sun gear S0 is ZS0, and the number of teeth of the differential unit ring gear R0 is ZR0, the gear ratio ρ0 is ZS0/ZR0.

In the power distribution mechanism 16, the differential unit carrier CA0 is linked to the input shaft 14, i.e., the engine 8, the differential unit sun gear S0 is linked to the first electric motor M1, and the differential unit ring gear R0 is linked to the transmission member 18.

Also, the switching brake B0 is provided between the differential unit sun gear S0 and the case 12, and the switching clutch C0 is provided between the differential unit sun gear S0 and the differential unit carrier CA0. When the switching clutch C0 and the switching brake B0 are both released, the differential unit sun gear S0, the differential unit carrier CA0, and the differential unit ring gear R0 that are the three elements of the differential unit planetary gear apparatus 24 are made capable of rotating relative to each other, and thus the power distribution mechanism 16 is put in a differential state in which differential action can operate, i.e., a state in which differential action acts. Thus, output of the engine 8 is distributed to the first electric motor M1 and the transmission member 18, and also, electric energy generated from the first electric motor M1 with a part of the distributed engine 8 output is accumulated, and the second electric motor M2 is rotationally driven by this electric energy, so the differential unit 11 (power distribution mechanism 16) is allowed to function as an electric differential apparatus. For example, the differential unit 11 is put in a so-called continuously variable gearshifting state (an electric CVT state), and rotation of the transmission member 18 is changed continuously (steplessly) regardless of the number of engine 8 revolutions. That is, when the power distribution mechanism 16 is put in a differential state, the differential unit 11 is also put in a differential state, thus establishing a continuously variable gearshifting state in which the differential unit 11 functions as an electric continuously variable transmission in which a gear ratio γ0 (revolution speed $N_{IN}$ of the input shaft 14/revolution speed $N_{18}$ of the transmission member 18) of the differential unit 11 is continuously changed from a minimum value γ0min to a maximum value γ0max. When the power distribution mechanism 16 is put in a differential state in this manner, the differential state of the power distribution mechanism 16, i.e., the differential state between the revolution speed of the input shaft 14 and the revolution speed of the transmission member 18, is controlled by controlling the operation state of each of the engine 8, the second electric motor M2, and the first electric motor M1 linked so as to be capable of transmitting motive power to the power distribution mechanism 16 (the differential unit 11).

In this state, when the switching clutch C0 or the switching brake B0 is engaged, the power distribution mechanism 16 does not perform the differential action, i.e., a non-differential state is established in which the differential action is not possible. Specifically, when the switching clutch C0 is engaged and so the differential unit sun gear S0 and the differential unit carrier CA0 are engaged as a single body, the differential unit sun gear S0, the differential unit carrier CA0, and the differential unit ring gear R0 that are the three elements of the differential unit planetary gear apparatus 24 rotate together, i.e., are put in a locked state in which they are rotated as a single body, and thus the power distribution mechanism 16 is put in a non-differential state in which the differential action is not possible, so the differential unit 11 also is put in a non-differential state. Also, in this state, the number of engine 8 revolutions matches the number of transmission member 18 revolutions, so the differential unit 11 (power distribution mechanism 16) is put in a fixed gearshifting state in which the differential unit 11 functions as a transmission in which the gear ratio γ0 has been fixed at '1', i.e., a stepped gearshifting state.

On the other hand, when the switching brake B0 is engaged instead of the switching clutch C0 and so the differential unit sun gear S0 is linked to the case 12, the power distribution mechanism 16 is put in a locked state in which the differential unit sun gear S0 is put in a non-rotating state, and thus the power distribution mechanism 16 is put in a non-differential state in which the differential action is not possible, so the differential unit 11 is also put in a non-differential state. Also, the differential unit ring gear R0 is rotated faster than the differential unit carrier CA0, so the power distribution mechanism 16 functions as an overdrive mechanism, and the differential unit 11 (power distribution mechanism 16) is put in a fixed gearshifting state in which the differential unit 11 functions as an overdrive transmission in which the gear ratio γ0 has been fixed at a value less than '1', for example '0.696', i.e., a stepped gearshifting state.

In this way, in the present embodiment, the switching clutch C0 and the switching brake B0 function as a differential state switching apparatus (limited slip differential means) that selectively switches the gearshifting state of the differential unit 11 (the power distribution mechanism 16) between a differential state (non-locked state) and a non-differential state (locked state). In other words, the differential unit 11 (power distribution mechanism 16) is switched between a differential state in which the differential unit 11 can operate as an electric differential apparatus, which, for example, is a continuously variable gearshifting state in which electric continuously variable gearshifting operation is possible in which the differential unit 11 operates as a continuously variable transmission with a continuously variable gear ratio; and a gearshifting state in which electric continuously variable gearshifting operation is not performed, which, for example, is a locked state in which the differential unit 11 is not operated as a continuously variable transmission and continuously variable gearshifting is made non-operational so that gear ratio change is locked to a fixed gear ratio, i.e., the differential unit 11 does not perform electric continuously variable gearshifting and operates as a transmission having one or multiple gears with one or two or more types of gear ratios, i.e., a fixed gearshifting state (non-differential state) in which electric continuously variable gearshifting is not possible, in other words, a fixed gearshifting state in which the differential unit 11 operates as a transmission having one or multiple gears with a fixed gear ratio.

When the switching clutch C0 and the switching brake B0 are released and a freely rotating state has been established in which the first electric motor M1 does not produce reactive force, the differential unit 11 is put in a motive power transmission cutoff state in which motive power transmission of the motive power transmission path in the differential unit 11 is cut off, and when the first electric motor M1 is allowed to generate reactive force or either one of the switching clutch C0 and the switching brake B0 has been engaged, a motive power transmission possible state is established in which motive power transmission of the motive power transmission path in the differential unit 11 is made possible. By putting the differential unit 11 in the motive power transmission cutoff state or the motive power transmission possible state, the drive apparatus 10 as a whole is put in the motive power transmission cutoff state or the motive power transmission possible state. However, in the present embodiment, the motive power transmission path between the second electric motor M2 and the drive wheels 38 is not cut off, so in order to put the drive apparatus 10 as a whole in the motive power transmission cutoff state, the second electric motor M2 is also put in the freely rotating state.

The switching clutch C0 and the switching brake B0 are hydraulic frictionally-engaged apparatuses often used in conventional vehicle stepped automatic transmissions. These hydraulic frictionally-engaged apparatuses are configured from a wet multiplate-type apparatus in which multiple friction plates that overlap each other are pressed by a hydraulic actuator, or a band brake in which one end of one or two bands wound around the outer circumferential face of a rotating drum is tightened by a hydraulic actuator, or the like, and are used for selectively linking members on both sides between which those hydraulic frictionally-engaged apparatuses are interposed.

—Continuously Variable Transmission Unit 20—

The continuously variable transmission unit 20 is a so-called belt-driven CVT transmission apparatus in which it is possible to continuously change a gear ratio $\gamma_{CVT}$ (=revolution speed $N_{18}$ of the transmission member 18/revolution speed $N_{OUT}$ of the output shaft 22) of the gearshift apparatus by mechanical action. The continuously variable transmission unit 20 is provided with an input side pulley 40 provided on a first axis RC1 and is linked to the transmission member 18, an output side pulley 42 that is provided in series with the input side pulley 40 on the second axis RC2 and is linked to the output shaft 22, and a belt 44 that is wound between the pair of pulleys 40 and 42 and links the pair of pulleys 40 and 42 together such that it is possible to transmit motive power between the pulleys 40 and 42.

The input side pulley 40 is configured from a conical input side slide pulley 46 that can slide in the rotational axis direction, and a conical input side fix pulley 48 that is fixed incapable of sliding. The input side slide pulley 46 and the input side fix pulley 48 are combined facing each other toward their apex, forming a V-shaped input side pulley groove 50 where the belt 44 makes contact. The output side pulley 42 and the input side pulley 40 have a similar configuration. The output side pulley 42 is configured from an output side slide pulley 52 and an output side fix pulley 54, and a V-shaped output side pulley groove 56 where the belt 44 makes contact is formed between the pulleys 52 and 54.

In the continuously variable transmission unit 20, tension is applied to the belt 44 in order to obtain frictional force for transmitting motive power between the belt 44 and each of the input side pulley 40 and the output side pulley 42, and at both the input side pulley groove 50 and the output side pulley groove 56, the belt 44 makes contact with the conical face of each of the pulleys 46, 48, 52, and 54. Therefore, as the input side slide pulley 46 is brought closer to the input side fix pulley 48 side in the input side pulley 40, and at the same time, the output side slide pulley 52 is moved away from the output side fix pulley 54 side in the output side pulley 42, the contact diameter (effective diameter) of the input side pulley 40 with the belt 44 increases, and the contact diameter (effective diameter) of the output side pulley 42 with the belt 44 decreases, so the gear ratio $\gamma_{CVT}$ of the continuously variable transmission unit 20 decreases. That is, the gear ratio $\gamma_{CVT}$ of the continuously variable transmission unit 20 is continuously changed by sliding the input side slide pulley 46 and the output side slide pulley 52 in synchronization with each other, by hydraulic control or the like.

—Gearshift Operation—

In the drive apparatus 10 configured in the above manner, the switching clutch C0 and the switching brake B0 are provided in the power distribution mechanism 16, and by causing either of the switching clutch C0 and the switching brake B0 to perform an engaging operation, it is possible to configure a fixed gearshifting state in which the differential unit 11 operates as a transmission in which the gear ratio $\gamma 0$ is fixed, in addition to a continuously variable gearshifting state in which the differential unit 11 operates as the above continuously variable transmission. Accordingly, in the drive apparatus 10, a continuously variable gearshifting state in which the drive apparatus 10 operates as a mechanical continuously variable transmission with the differential unit 11 put in the fixed gearshifting state by causing either of the switching clutch C0 and the switching brake B0 to perform an engaging operation and the continuously variable transmission unit 20 is configured, and a continuously variable gearshifting state in which the drive apparatus 10 operates as an electric and mechanical continuously variable transmission with the differential unit 11 put in the continuously variable gearshifting state by not causing either of the switching clutch C0 and the switching brake B0 to perform an engaging operation and the continuously variable transmission unit 20 is configured. When establishing a neutral 'N' state in which the motive power transmission path within the drive apparatus 10 has been cut off, for example, the switching clutch C0 and the switching brake B0 are released so that the first electric motor M1 and the second electric motor M2 both freely rotate.

In the drive apparatus 10, when the switching clutch C0 and the switching brake B0 have both been released, the differential unit 11 therefore functions as an electric continuously variable transmission, the continuously variable transmission unit 20 in series with the differential unit 11 functions as a mechanical continuously variable transmission. Thus, the total gear ratio (overall gear ratio) $\gamma T$ (=revolution speed $N_{IN}$ of the input shaft 14/revolution speed $N_{OUT}$ of the output shaft 22) of the drive apparatus 10, which is the product of the gear ratio $\gamma 0$ of the differential unit 11 and the gear ratio $\gamma_{CVT}$ of the continuously variable transmission unit 20, is obtained continuously variably.

Figure 2:
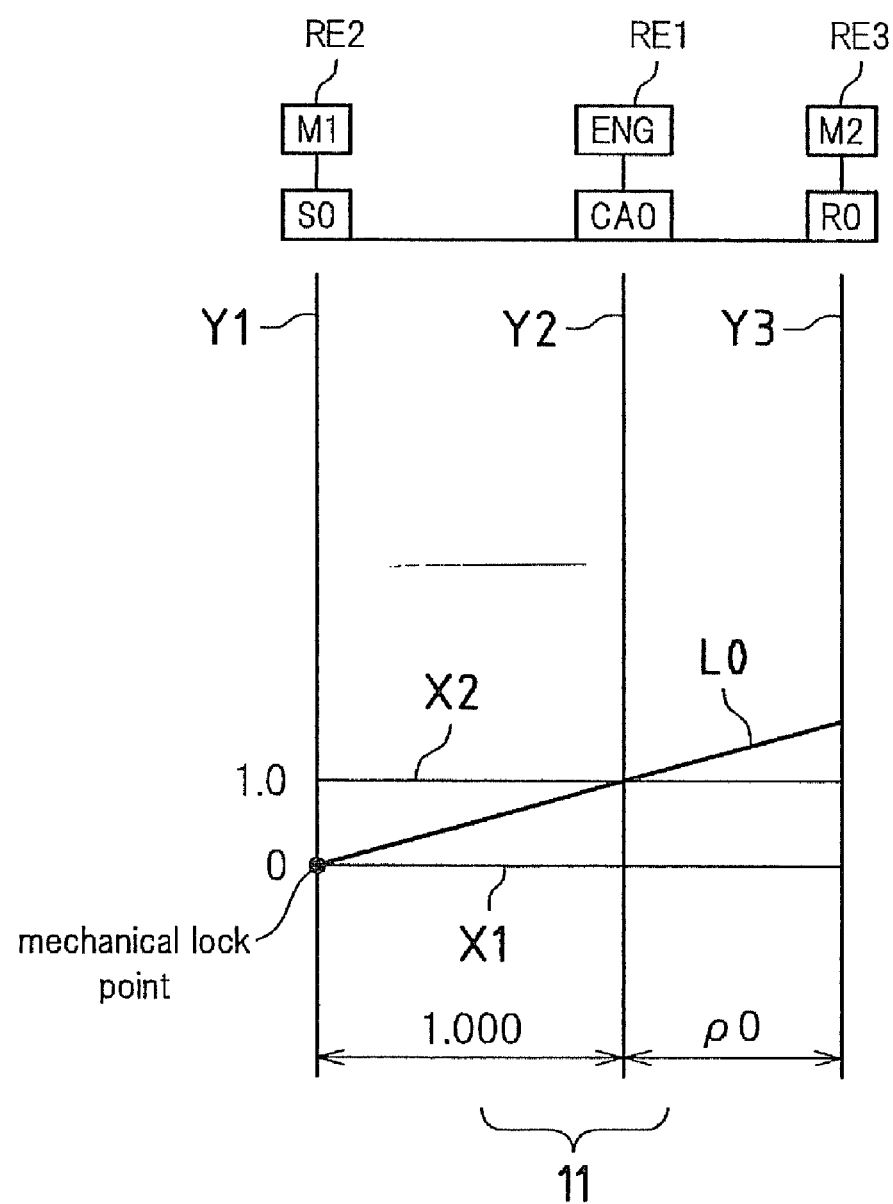
FIG. 2 is a collinearity diagram that shows the relative relationship of the revolution speeds of rotating elements in the hybrid vehicle drive apparatus of FIG. 1 on a straight line.

FIG. 2 is a collinearity diagram (collinearity diagram in a specific motive power transmission state) that shows the relative relationship of the revolution speeds of rotating elements in the drive apparatus 10 configured from the differential unit 11 that functions as a first transmission unit and the continuously variable transmission unit 20 that functions as the second transmission unit. The collinearity diagram of FIG. 2 is a two-dimensional coordinate system made up of a horizontal axis that shows each rotating element and a vertical axis that shows relative revolution speed. Among the two horizontal lines, the lower horizontal line X1 indicates revolution speed zero, and the upper horizontal line X2 indicates revolution speed '1.0', i.e., revolution speed $N_E$ of the engine 8 linked to the input shaft 14.

Three vertical lines Y1, Y2, and Y3 that correspond to each rotating element of the drive apparatus 10 indicate, in order from left to right, the differential unit sun gear S0 corresponding to the second rotating element (second element) RE2, the differential unit carrier CA0 corresponding to the first rotating element (first element) RE1, and the differential unit ring gear R0 corresponding to the third rotating element (third element) RE3 and linked to the input side pulley 40. In the relationship between vertical axes in the collinearity diagram, when a gap corresponding to '1' is set between the differential unit sun gear S0 and the differential unit carrier CA0 in the planetary gear apparatus, a gap is set between the differential unit carrier CA0 and the differential unit ring gear R0 that corresponds to the gear ratio $\rho$ of the planetary gear apparatus. That is, a gap is set between the vertical lines Y1 and Y2 that corresponds to '1' in the differential unit 11, and a gap is set between the vertical lines Y2 and Y3 that corresponds to the gear ratio $\rho$.

As expressed by the collinearity diagram in FIG. 2, the drive apparatus 10 of the present embodiment is configured such that in the power distribution mechanism 16 (differential unit 11), the first rotating element RE1 (differential unit carrier CA0) of the differential unit planetary gear apparatus 24 is linked to the input shaft 14, i.e. the engine 8, and is selectively linked to the second rotating element (differential unit sun gear S0) RE via the switching clutch C0, this second rotating element RE2 is linked to the first electric motor M1 and is selectively linked to the case 12 via the switching brake B0, and the third rotating element (differential unit ring gear R0) RE3 is linked to the transmission member 18 and the second electric motor M2. Thus, rotation of the input shaft 14 is transmitted (input) to the continuously variable transmission unit 20 via the transmission member 18. At this time, the straight line L0 that passes through the intersection of Y2 and X2 indicates the relationship of the revolution speed of the differential unit sun gear S0 and the revolution speed of the differential unit ring gear R0.

For example, when the differential unit 11 has been switched to the continuously variable gearshifting state (differential state) by releasing the switching clutch C0 and the switching brake B0, rotation of the differential unit sun gear S0 indicated by the intersection of the straight line L0 and the vertical line Y1 is increased or decreased by controlling the revolution speed of the first electric motor M1, and when the revolution speed of the differential unit ring gear R0 is approximately constant, the revolution speed of the differential unit carrier CA0 indicated by the intersection of the straight line L0 and the vertical line Y2 is increased or decreased. Also, when the differential unit sun gear S0 and the differential unit carrier CA0 are linked by engagement of the switching clutch C0, the power distribution mechanism 16 is put in a non-differential state in which the differential unit sun gear S0, the differential unit carrier CA0, and the differential unit ring gear R0 rotate as a single body, so the straight line L0 is matched to the horizontal line X2, and thus the transmission member 18 is caused to rotate with the same rotation as the engine revolution speed $N_E$. Alternatively, when rotation of the differential unit sun gear S0 is stopped by engagement of the switching brake B0, the power distribution mechanism 16 is put in a non-differential state in which it functions as an overdrive mechanism, so the straight line L0 is in the state shown in FIG. 2, and thus the revolution speed of the differential unit ring gear R0, i.e. the transmission member 18, indicated by the intersection of the straight line L0 and the vertical line Y3 is input to the continuously variable transmission unit 20 at an overdriven rotation relative to the engine revolution speed $N_E$.

Also, in the continuously variable transmission unit 20, the gear ratio $\gamma_{CVT}$ thereof is continuously changed, and motive power is transmitted to output.

—Electronic Control Apparatus 60—

Figure 3:
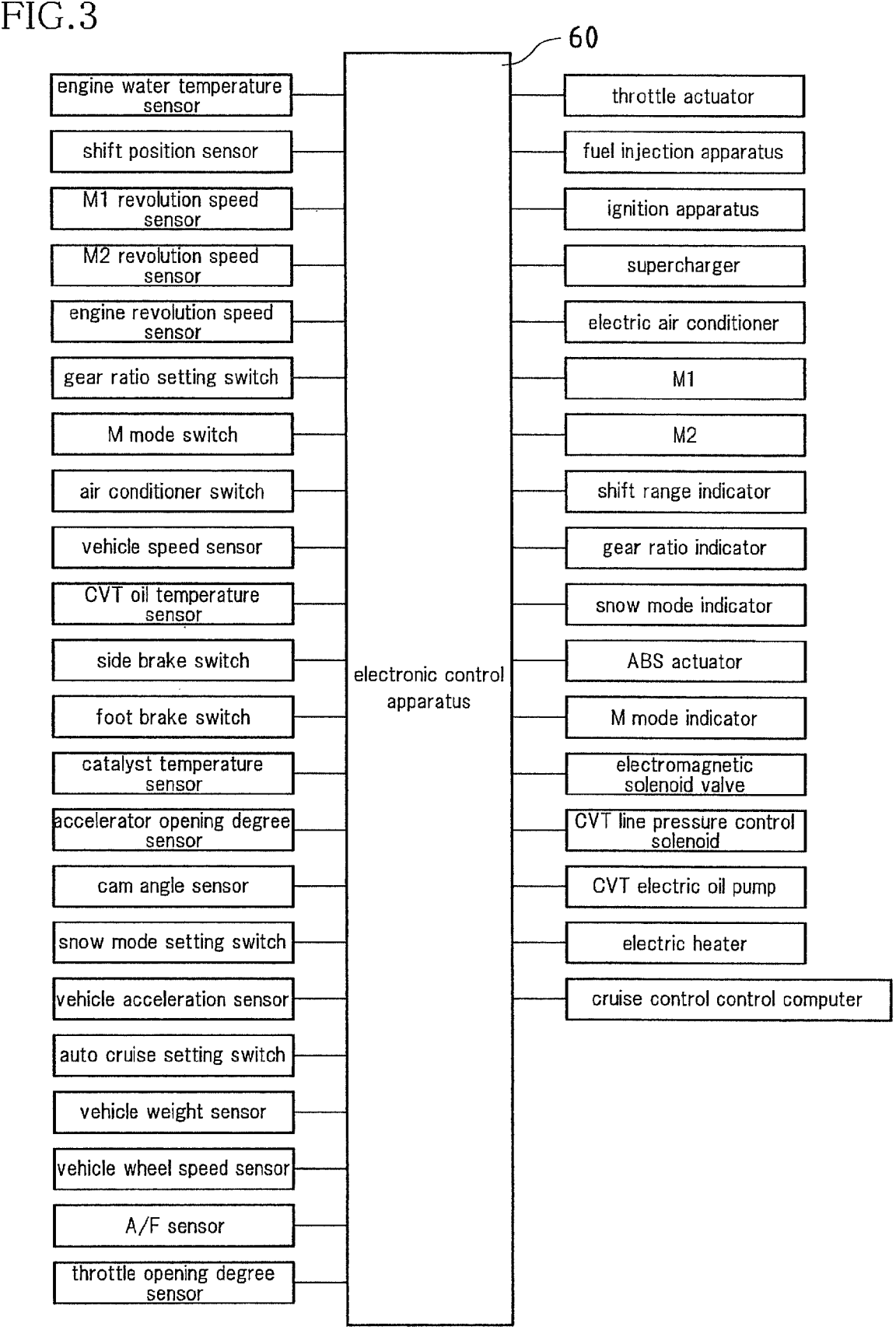
FIG. 3 illustrates input/output signals of an electronic control apparatus provided in the hybrid vehicle drive apparatus of FIG. 1.

FIG. 3 shows signals input to an electronic control apparatus 60, which is a control apparatus for controlling the drive apparatus 10, and signals output from that electronic control apparatus 60. The electronic control apparatus 60 includes a so-called microcomputer configured from a CPU, a ROM, a RAM, an input/output interface, and the like, and by performing signal processing according to a program stored in advance in the ROM while using a temporary storage function of the RAM, executes drive control such as hybrid drive control related to the engine 8, the first electric motor M1, and the second electric motor M2, and gearshift control of the continuously variable transmission unit 20.

Various signals are supplied to the electronic control apparatus 60 from the sensors and switches shown in FIG. 3, such as a signal that expresses an engine water temperature $TEMP_W$, a signal that expresses a shift position $P_{SH}$, a signal that expresses a revolution speed $N_{M1}$ of the first electric motor M1 (referred to below as a 'first electric motor revolution speed $N_{M1}$'), a signal that expresses a revolution speed $N_{M2}$ of the second electric motor M2 (referred to below as a 'second electric motor revolution speed $N_{M2}$'), a signal that expresses an engine revolution speed $N_E$ that is the revolution speed of the engine 8, a signal that indicates a gear ratio setting value, a signal that commands an M mode (manual gearshift running mode), an air conditioning signal that indicates operation of an air conditioner, a signal that expresses a vehicle speed V that corresponds to a revolution speed $N_{OUT}$ (referred to below as an output shaft revolution speed $N_{OUT}$) of the output shaft 22, an oil temperature signal that indicates an operating oil temperature $TEMP_{CVT}$ of the continuously variable transmission unit 20 detected by a CVT oil temperature sensor, a signal that indicates a side brake operation, a signal that indicates a foot brake operation, a catalyst temperature signal that indicates a catalyst temperature, an accelerator opening degree signal that indicates an accelerator opening degree Acc (accelerator pedal operation amount Acc) that corresponds to the amount of output requested by the driver, a cam angle signal, a snow mode setting signal that indicates a snow mode setting, an acceleration signal that indicates vehicle front-rear acceleration, an auto cruise signal that indicates auto cruise running, a vehicle weight signal that indicates vehicle weight, a wheel speed signal that indicates the wheel speed of each vehicle wheel, a signal that indicates an air-fuel ratio A/F of the engine 8, and a signal that indicates the opening degree of a throttle valve.

Also, various control signals are supplied from the electronic control apparatus 60 to an engine output control apparatus 64 (see FIG. 5) that controls engine output, such as a drive signal to a throttle actuator 97 that operates an opening degree $\theta_{TH}$ of an electronic throttle valve 96 provided in an intake pipe 95 of the engine 8, a fuel supply amount signal that controls the amount of fuel supplied to each cylinder of the engine 8 by a fuel injection apparatus 98, an ignition signal that commands ignition timing of the engine 8 by an ignition apparatus 99, a supercharging pressure adjustment signal for adjusting a supercharging pressure, an electric air conditioner drive signal for operating an electric air conditioner, a command signal that commands operation of the electric motors M1 and M2, a shift position (operation position) display signal for operating a shift indicator, a gear ratio display signal for displaying a gear ratio, a snow mode display signal for displaying that a snow mode is active, an ABS operation signal for operating an ABS actuator that prevents wheel slippage during braking, an M mode display signal that displays that the M mode is selected, a valve command signal that operates an electromagnetic solenoid valve included in a hydraulic control circuit 62 (see FIG. 5) for controlling hydraulic actuators of the differential unit 11 and the continuously variable transmission unit 20, a valve command signal that operates a line pressure control solenoid valve for adjusting a line pressure supplied to that electromagnetic solenoid valve, a drive command signal for operating an electric hydraulic pump, which is a hydraulic source of the hydraulic control circuit 62, a signal for driving an electric heater, and a signal supplied to a cruise control computer.

—Shift Operation Apparatus 66—

Figure 4:
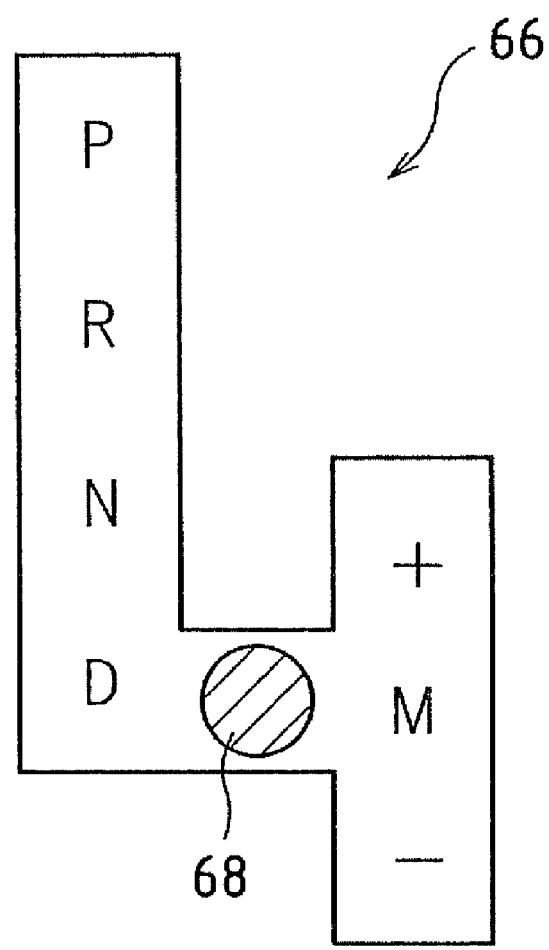
FIG. 4 shows an example of a shift operation apparatus that is operated in order to select multiple types of shift positions and is provided with a shift lever for operating the hybrid vehicle drive apparatus of FIG. 1.

FIG. 4 shows an example of a shift operation apparatus 66 as a switching apparatus that switches a plurality of types of a shift position $P_{SH}$. This shift operation apparatus 66, for example, is disposed near a driver's seat and is provided with a shift lever 68 that is operated in order to select the plurality of types of the shift position $P_{SH}$.

The shift lever 68 is provided so as to be manually operated to a parking position 'P (parking)' for establishing a neutral state in which the motive power transmission path in the drive apparatus 10 has been cut off and locking the output shaft 22, a reverse running position 'R (reverse)' for reverse running, a neutral position 'N (neutral)' for establishing a neutral state in which the motive power transmission path in the drive apparatus 10 has been cut off, a forward automatic gearshift running position 'D (drive)' in which automatic gearshift control is executed in the range of change of the total gear ratio $\gamma T$ that the drive apparatus 10 can be gearshifted, or a forward manual gearshift running position 'M (manual)' for establishing a manual gearshift running mode (manual mode) and setting a so-called gearshift range that limits the gear on the high speed side in the automatic gearshift control.

According to the shift position $P_{SH}$ that has been selected by manual operation of the shift lever 68, for example, the hydraulic control circuit 62 is electrically switched so that the motive power transmission path in the drive apparatus 10 is changed to correspond to the selected shift position $P_{SH}$. For example, when the 'P' position or the 'N' position has been selected as the shift position $P_{SH}$, the switching clutch C0 and the switching brake B0 are both released, putting the first electric motor M1 and the second electric motor M2 in the freely rotating state, so the motive power transmission path in the drive apparatus 10 is put in a motive power transmission cutoff state.

<Control Means>

Figure 5:
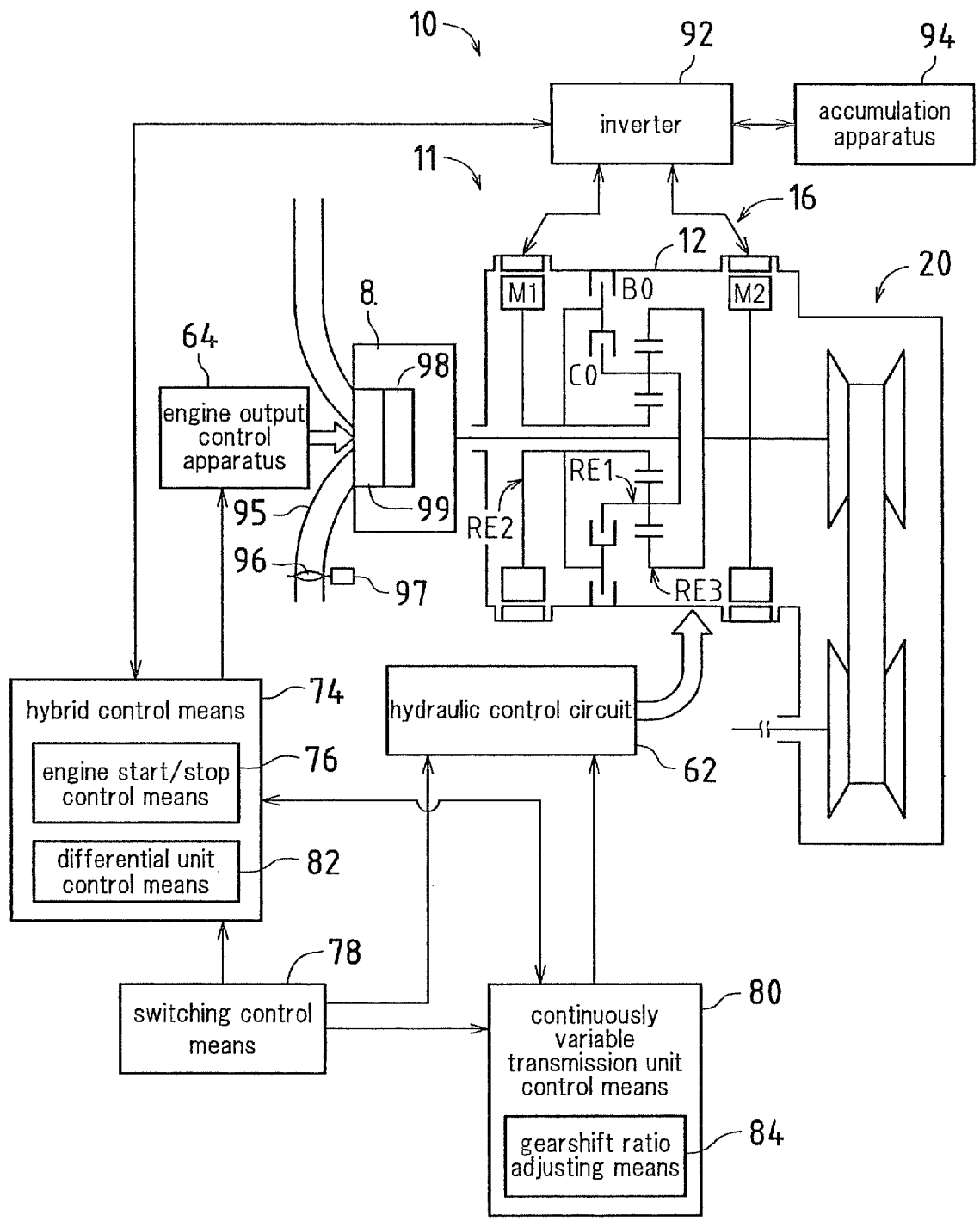
FIG. 5 is a functional block diagram that illustrates relevant parts of control functions of the electronic control apparatus of FIG. 3.

FIG. 5 is a functional block diagram that illustrates relevant parts of control functions of the electronic control apparatus 60. In FIG. 5, the hybrid control means 74, in the differential state of the differential unit 11, operates the engine 8 in a high efficiency operation region, and changes the drive power distribution of the engine 8 and the second electric motor M2 and the reactive force due to electricity generation of the first electric motor M1 to be optimal, and thus controls the gear ratio $\gamma 0$ of the differential unit 11 as an electric continuously variable transmission. For example, for the running vehicle speed at that time, a vehicle target (requested) output is calculated from the accelerator opening degree (accelerator pedal operation amount) Acc as the driver's output request amount and vehicle speed V, the necessary total target output is calculated from the vehicle target output and a charging request value, target engine output is calculated in consideration of transmission loss, accessory load, assist torque of the second electric motor M2, and the like, such that the total target output is obtained, and the engine 8 is controlled and the electricity generation amount of the first electric motor M1 is controlled so as to produce the engine revolution speed $N_E$ and the engine torque $T_E$ at which that target engine output is obtained.

The hybrid control means 74 executes that control in consideration of the gear ratio $\gamma_{CVT}$ of the continuously variable transmission unit 20 for motive power properties, specific fuel consumption improvement, and the like. With this sort of hybrid control, the differential unit 11 is allowed to function as an electric continuously variable transmission, in order to coordinate the engine revolution speed $N_E$ that are determined in order to operate the engine 8 in a high efficiency region, and the revolution speed $N_{18}$ of the transmission member 18 determined by vehicle speed V and the gear ratio $\gamma_{CVT}$ of the continuously variable transmission unit 20. That is, the hybrid control means 74 stores in advance, for example, a combustion efficiency optimal line $L_{EF}$ (optimal specific fuel consumption rate curve $L_{EF}$, specific fuel consumption map) in a two-dimensional coordinate system as shown in the specific fuel consumption map in FIG. 6, in which the engine revolution speed $N_E$ and the output torque (engine torque) $T_E$ of the engine 8 are used as parameters, the combustion efficiency optimal line $L_{EF}$ being an engine 8 operation curve that has been determined such that good operability and specific fuel consumption are both obtained during continuously variable gearshifting running, i.e., that has been empirically determined in advance in order to improve specific fuel consumption of the engine 8, determines the target value of the total gear ratio γT of the drive apparatus 10 such that the engine 8 is allowed to operate along that combustion efficiency optimal line $L_{EF}$, for example, such that the engine torque $T_E$ and the engine revolution speed $N_E$ for generating the necessary engine output for satisfying the target output (total target output, requested drive power) are produced, and controls the gear ratio γ0 of the differential unit 11 such that that target value is obtained.

At this time, the hybrid control means 74 supplies the electric energy generated by the first electric motor M1 to an accumulation apparatus 94 and the second electric motor M2 via an inverter 92, so the major part of the motive power of the engine 8 is mechanically transmitted to the transmission member 18, but part of the motive power of the engine 8 is consumed for electricity generation of the first electric motor M1 and consequently converted to electric energy, that electric energy is supplied to the second electric motor M2 via the inverter 92, and that second electric motor M2 is driven to transmit the energy from the second electric motor M2 to the transmission member 18. By devices involved from generation of this electric energy to consumption of the energy by the second electric motor M2, an electrical path is constituted where a part of the motive power of the engine 8 is converted to electric energy and the electric energy is converted to mechanical energy.

The hybrid control means 74 is functionally provided with an engine output control means that performs opening/closing control of an electronic throttle valve 96 by a throttle actuator 97 in order to perform throttle control, and also controls a fuel injection amount and injection timing by a fuel injection apparatus 98 in order to perform fuel injection control, and outputs commands to the engine output control apparatus 64 singly or in combination that control ignition timing by an ignition apparatus 99 such as an igniter in order to perform ignition timing control, thus executing engine 8 output control so as to generate necessary engine output. For example, the hybrid control means 74 basically drives the throttle actuator 97 based on the accelerator opening degree signal Acc from an unshown relationship that has been stored in advance, and executes throttle control so as to increase the throttle valve opening degree $\theta_{TH}$ as the accelerator opening degree Acc increases.

Figure 7:
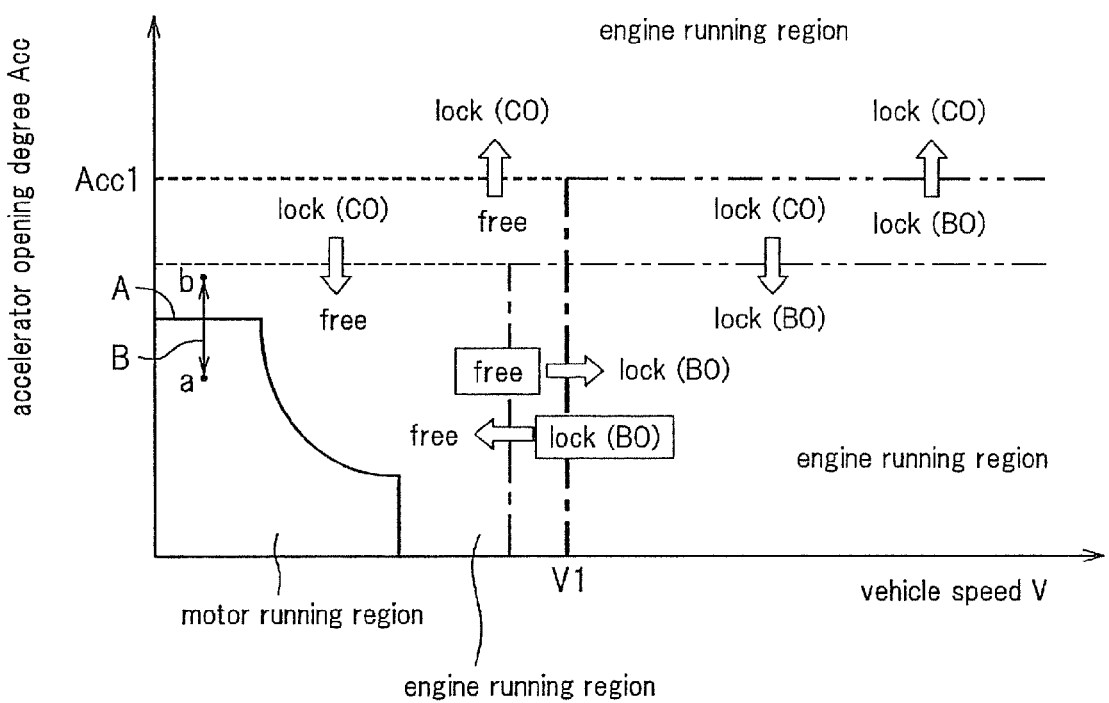
FIG. 7 shows an example of a differential state switching line diagram that has been stored in advance and is the basis of a switching judgment of the differential state of a differential unit, and an example of a drive power source switching line diagram that has been stored in advance and has a border line of an engine running region and a motor running region for switching between engine running and motor running, that are configured in the same two-dimensional coordinates and use vehicle speed and accelerator opening degree as parameters, with respect to the hybrid vehicle drive apparatus of FIG. 1.

The solid line A in FIG. 7 is a border line between an engine running region and a motor running region for switching a vehicle starting/running (below, referred to as running) drive power source between the engine 8 and an electric motor, for example the second electric motor M2, i.e., for switching between so-called engine running in which the vehicle is caused to start/run (below, referred to as run) with the engine 8 as a running drive power source, and so-called motor running in which the vehicle is caused to run with the second electric motor M2 as a running drive power source. The relationship stored in advance that has this border line (solid line A) for switching between engine running and motor running shown in FIG. 7 is an example of a drive power source switching line diagram (drive power source map) configured with a two-dimensional coordinate system in which the vehicle speed V and the accelerator opening degree Acc are used as parameters. This drive power source switching line diagram is stored in advance in the hybrid control means 74, for example.

The hybrid control means 74, judges whether the vehicle state is in the motor running region or the engine running region, for example, from the drive power source switching line diagram in FIG. 7, based on the vehicle state indicated by the vehicle speed V and the accelerator opening degree Acc, and executes motor running or engine running. In this way, as is clear from FIG. 7, motor running by the hybrid control means 74 is executed when the accelerator opening degree Acc is comparatively low, which is when engine efficiency is ordinarily considered to be poor compared to a high torque region, i.e. during low engine torque $T_E$, or is executed when vehicle speed V is comparatively low, i.e. in a low load region.

The hybrid control means 74, during this motor running state, controls, e.g., idles, the first electric motor revolution speed $N_{M1}$ at a negative revolution speed in order to suppress drag of the stopped engine 8 to improve specific fuel consumption, and keeps the engine revolution speed $N_E$ at zero or substantially zero with the differential action of the differential unit 11.

The hybrid control means 74 selectively switches between engine running and motor running. Therefore, the hybrid control means 74 is provided with an engine start/stop control means 76 that performs starting and stopping of the engine 8. The engine start/stop control means 76 starts or stops the engine 8 when switching between motor running and engine running has been judged by the hybrid control means 74 based on the vehicle state from the drive power source switching line diagram in FIG. 7, for example.

For example, as shown from point a to point b of the solid line B in FIG. 7, when the accelerator pedal is depressed and the accelerator opening degree Acc increases so that the vehicle state changes from the motor running region to the engine running region, the engine start/stop control means 76, by turning on power to the first electric motor M1 and raising the first electric motor revolution speed $N_{M1}$, i.e., by operating the first electric motor M1 as a starter, for example, starts the engine 8 by raising the engine revolution speed $N_E$ to the revolution speed at which it is capable of rotating on its own, and igniting the engine 8 with the ignition apparatus 99, thus switching from motor running to engine running. At this time, the engine start/stop control means 76, by quickly raising the first electric motor revolution speed $N_{M1}$, may perform engine starting by quickly avoiding a well-known resonance region in the engine revolution speed region at or below an idle revolution speed $N_{EIDL}$, thus suppressing vibration during that start.

Also, as shown from point b to point a of the solid line B in FIG. 7, when the accelerator pedal is returned and the accelerator opening degree Acc decreases so that the vehicle state changes from the engine running region to the motor running region, the engine start/stop control means 76, by stopping fuel supply by the fuel injection apparatus 98, i.e., by cutting fuel, stops the engine 8, thus switching from engine running to motor running. At this time, the engine start/stop control means 76, by quickly lowering the first electric motor revolution speed $N_{M1}$, may quickly lower the engine revolution speed $N_E$ to zero or substantially zero. Thus, it is possible to quickly avoid the resonance region, so that vibration when stopping is suppressed.

Also, in the engine running region as well, the hybrid control means 74 supplies the electric energy from the first electric motor M1 and/or the electric energy from the accumulation apparatus 94 to the second electric motor M2 by the above electrical path, and torque assist that supplements the motive power of the engine 8 is possible by driving the second electric motor M2. Thus, in the present embodiment, vehicle running in which both the engine 8 and the second electric motor M2 are used as a running drive power source is included in engine running, not motor running.

Also, the hybrid control means 74 is capable of maintaining the operation state of the engine 8 with the electric CVT function (differential action) of the differential unit 11, regardless of being in a vehicle stoppage state or a low vehicle speed state. For example, in a case where a charge remaining amount SOC of the accumulation apparatus 94 decreases during vehicle stoppage and so electricity generation by the first electric motor M1—is necessary, the first electric motor M1 is caused to generate electricity by the motive power of the engine 8 and the revolution speed of the first electric motor M1 is raised, so even if a second electric motor revolution speed $N_{M2}$ becomes zero (substantially zero) due to the vehicle stoppage state, by the differential action of the power distribution mechanism 16, the engine revolution speed $N_E$ is maintained to at least a revolution speed at which the engine 8 can rotate on its own.

Also, the hybrid control means 74, regardless of whether the vehicle is stopped or is running, controls the first electric motor revolution speed $N_{M1}$ and/or the second electric motor revolution speed $N_{M2}$ with the electric CVT function of the differential unit 11 to maintain the engine revolution speed $N_E$ at a desired revolution speed. For example, as is also understood from the collinearity diagram in FIG. 2, the hybrid control means 74, when raising the engine revolution speed $N_E$, raises the first electric motor revolution speed $N_{M1}$ while keeping the second electric motor revolution speed $N_{M2}$ approximately constant.

The switching control means 78, by switching engaging/releasing of the limited slip differential means (the switching clutch C0 and the switching brake B0) based on the vehicle state, selectively switches between the continuously variable gearshifting state and the stepped gearshifting state, i.e., the differential state and the locked state, of the differential unit 11. For example, a differential state switching line diagram (differential state switching map) shown by broken lines, single-dotted chained lines, and double-dotted chained lines expressed in a coordinate system, the same as FIG. 7, is stored in advance, and based on the vehicle state indicated by the vehicle speed V and the accelerator opening degree Acc from that differential state switching line diagram, the switching control means 78 judges whether or not the switching brake B0 or the switching clutch C0 should be engaged (locked), and engages or releases the switching brake B0 or the switching clutch C0 by outputting a command signal to the hydraulic control circuit 62. For example, when the accelerator opening degree Acc is a high opening degree greater than the determining accelerator opening degree Acc1 in FIG. 7, the vehicle state is in a C0 lock region, so the switching control means 78 engages the switching clutch C0 to fix the gear ratio γ0 of the differential unit 11 to 1 (fixed to a low gear ratio). When the accelerator opening degree Acc is comparatively low so the vehicle state does not enter the C0 lock region, and the vehicle speed V is a high vehicle speed greater than the determining vehicle speed V1 in FIG. 7, the vehicle state is in a B0 lock region, so the switching control means 78 engages the switching brake B0 to allow the differential unit 11 to function as an overdrive transmission in which the gear ratio γ0 has been fixed at '0.696' (fixed to a high gear ratio). That is, this switching control means 78 is also provided with a function as a low/high switching control means in the invention.

When the switching brake B0 or the switching clutch B0 has been engaged, differential control that allows the differential unit 11 to function as an electric continuously variable transmission is prohibited to the hybrid control means 74, and on the other hand, in the case of a vehicle state indicated by a low accelerator opening degree Acc and a low vehicle speed V, in a region of continuously variable control of the differential unit 11 not belonging to the B0 lock region or the C0 lock region, the switching brake B0 and the switching clutch B0 are released, and the differential control is allowed to the hybrid control means 74.

Described in detail here with respect to FIG. 7, the thick broken line in FIG. 7 indicates a determining accelerator opening degree Acc1 for determining a region of continuously variable control and a C0 lock region of the differential unit 11 by the switching control means 78, and the thick single-chained line in FIG. 7 indicates a determining vehicle speed V1 for determining a region of continuously variable control and a B0 lock region of the differential unit 11. In the case of a high accelerator opening degree Acc greater than the determining accelerator opening degree Acc1 and a high vehicle speed V greater than the determining vehicle speed V1, the vehicle state is in the C0 lock region, not the B0 lock region. Further, the determining accelerator opening degree Acc1 and the determining vehicle speed V1 indicated by the thick broken line, single-chained line and double-chained line in FIG. 7 are respectively provided with hysteresis, as indicated by the thin broken line, single-chained line and double-chained line. This differential state switching line diagram shown in FIG. 7 may include at least one of the determining accelerator opening degree Acc1 and the determining vehicle speed V1, or may be composed of switching lines stored in advance in which either of the accelerator opening degree Acc and the vehicle speed V is used as a parameter.

Also, when a breakdown or function decrease of a control device of an electrical system such as an electric motor for allowing the differential unit 11 to operate as an electric continuously variable transmission, for example, a function decrease of devices related to an electrical path from generation of electric energy in the first electric motor M1 to conversion of that electric energy to mechanical energy, i.e., breakdown (failure) of the first electric motor M1, the second electric motor M2, the inverter 92, the accumulation apparatus 94, a transmission path in which they are connected, or the like, or a function decrease due to breakdown or low temperature has occurred, the switching control means 78 may preferentially engage the switching brake B0 or the switching clutch C0 in order to insure vehicle running even if the vehicle state is in the region of continuously variable control of the differential unit 11.

Also, for example, so as to suppress a reduction in specific fuel consumption when the differential unit 11 is put in the differential state in high speed running, the determining vehicle speed V1 is set such that the differential unit 11 is put in the non-differential state in that high speed running. Also, in order to reduce the size of the first electric motor M1 by not making reactive force torque of the first electric motor M1 compatible with a high output region of the engine 8 in high output running of the vehicle, for example, the determining accelerator opening degree Acc1 is set according to the properties of the first electric motor M1 made installable by reducing the maximum output of the electric energy from the first electric motor M1.

In this way, the differential unit 11 (drive apparatus 10) of the present embodiment can be selectively switched between the continuously variable gearshifting state and the stepped gearshifting state (fixed gearshifting state), and the switching control means 78 judges the gearshifting state to which the differential unit 11 should be switched based on the vehicle state, and selectively switches the differential unit 11 to either the continuously variable gearshifting state or the stepped gearshifting state. Also, in the present embodiment, motor running or engine running is executed by the hybrid control means 74 based on the vehicle state, and in order to switch between engine running and motor running, the engine start/stop control means 76 starts or stops the engine 8.

A continuously variable transmission unit control means 80 functions as a gearshift control means that outputs a command signal to the hydraulic control circuit 62 to slide the input side slide pulley 46 and the output side slide pulley 52 in synchronization, thus changing the gear ratio $\gamma_{CVT}$ of the continuously variable transmission unit 20 to perform gearshifting of the continuously variable transmission unit 20. For example, the continuously variable transmission unit control means 80 determines the gear ratio $\gamma_{CVT}$ from the relationship of the vehicle speed V and accelerator opening degree Acc set in advance according to the differential state of the differential unit 11, and executes gearshift control of the continuously variable transmission unit 20 such that that gear ratio $\gamma_{CVT}$ is obtained.

Here, with control of the gear ratio $\gamma 0$ of the differential unit 11 by the hybrid control means 74, in order to improve specific fuel consumption during engine running, the engine 8 is operated such that an engine operation point $P_{EG}$ (see FIG. 6) of the operation state of the engine 8 indicated by the engine revolution speed $N_E$, the engine torque $T_E$, and the like follows the combustion efficiency optimal line $L_{EF}$ (so as to be at the point at which specific fuel consumption is optimal), and further, a transmission efficiency $\eta_{11}$ of output (drive energy) from the engine 8 in the differential unit 11 is improved, so an improvement in specific fuel consumption of the vehicle as a whole is achieved. Relevant parts of that control function are described below.

Figure 8:
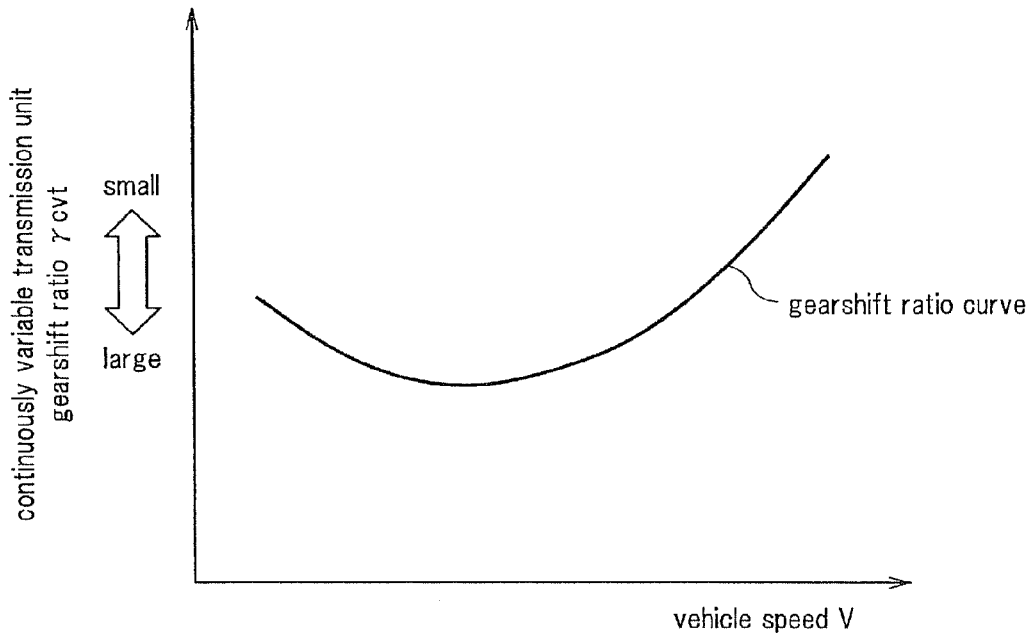
FIG. 8 shows a continuously variable transmission unit gear ratio map, used by the continuously variable transmission unit control means in FIG. 5 to determine the basic gear ratio of the continuously variable transmission unit, that indicates the relationship between vehicle speed and the gear ratio of the continuously variable transmission unit.

The continuously variable transmission unit control means 80 executes gearshift control of the continuously variable transmission unit 20 as described above, but during engine running, when the differential unit 11 is in the differential state (continuously variable gearshifting state), the continuously variable transmission unit control means 80 determines (sets) the gear ratio $\gamma_{CVT}$ of the continuously variable transmission unit 20 based on the vehicle speed V from the continuously variable transmission unit gear ratio map shown in FIG. 8 that determines the relationship of the vehicle speed V and the gear ratio $\gamma_{CVT}$ of the continuously variable transmission unit 20. The continuously variable transmission unit gear ratio map in FIG. 8 ideally shows the relationship between the vehicle speed V and the gear ratio $\gamma_{CVT}$ that has been obtained from advance testing or the like and set, such that when the gear ratio $\gamma_{CVT}$ is determined from the vehicle speed V according to that continuously variable transmission unit gear ratio map, and the engine 8 has been operated at the engine operation point $P_{EG}$ on the combustion efficiency optimal line $L_{EF}$, the first electric motor revolution speed $N_{M1}$ becomes zero or substantially zero, i.e., such that in the collinearity diagram of FIG. 2, the first electric motor revolution speed $N_{M1}$ is at a mechanical lock point that indicates rotation stoppage. Accordingly, it can be said that the continuously variable transmission unit control means 80 that determines the gear ratio $\gamma_{CVT}$ of the continuously variable transmission unit 20 from FIG. 8 sets the gear ratio $\gamma_{CVT}$ of the continuously variable transmission unit 20 based on the vehicle speed V and the combustion efficiency optimal line $L_{EF}$ such that the engine operation point $P_{EG}$ follows that combustion efficiency optimal line $L_{EF}$. Also, it can be said that the transmission efficiency $\eta_{11}$ of the differential unit 11 improves as the first electric motor revolution speed $N_{M1}$ approaches zero, so the basic gear ratio, which is the gear ratio $\gamma_{CVT}$ of the continuously variable transmission unit 20 determined according to FIG. 8, is a gear ratio that has been set (determined) such that the transmission efficiency $\eta_{11}$ of the differential unit 11 is sufficiently high, and stated more specifically, such that the transmission efficiency $\eta_{11}$ is no less than a predetermined lower limit value.

Also, the continuously variable transmission unit control means 80 is provided with a gear ratio adjusting means 84 as described below, and even in a case where the switching brake B0 is engaged, the first electric motor M1 is kept at the mechanical lock point, and rotation thereof has been stopped, the gear ratio $\gamma_{CVT}$ of the continuously variable transmission unit 20 is determined (set) based on the vehicle speed V from the continuously variable transmission unit gear ratio map shown in FIG. 8 that determines the relationship of the vehicle speed V and the gear ratio $\gamma_{CVT}$ of the continuously variable transmission unit 20. Also, when the switching clutch C0 is engaged, establishing a state in which the first electric motor M1 rotates as a single body with the input shaft 14, the gear ratio $\gamma_{CVT}$ is set to a smaller gear ratio than when the switching brake B0 has been engaged. The details of this gear ratio adjusting operation by the gear ratio adjusting means 84 will be described later.

The hybrid control means 74 has a differential unit control means 82 in order to increase the transmission efficiency $\eta_{11}$ of the differential unit 11. In a case where the differential unit 11 is in the differential state (continuously variable gearshifting state) during engine running, when the continuously variable transmission unit control means 80 determines the gear ratio $\gamma_{CVT}$ of the continuously variable transmission unit 20 from the continuously variable transmission unit gear ratio map in FIG. 8, the differential unit control means 82 controls the first electric motor revolution speed $N_{M1}$ to determine (set) and change the gear ratio $\gamma 0$ of the differential unit 11 so as to increase the transmission efficiency $\eta_{11}$ of the output from the engine 8 in the differential unit 11. The transmission efficiency $\eta_{11}$ of the differential unit 11 increases as the electrical path amount, which is electric energy transmitted between the first electric motor M1 and the second electric motor M2, i.e., the electric power of the first electric motor M1, approaches zero, so the differential unit control means 82 increases the transmission efficiency T1 of the differential unit 11 by bringing the electric power of the first electric motor M1, which is the differential electric motor, nearer to zero.

Figure 9:
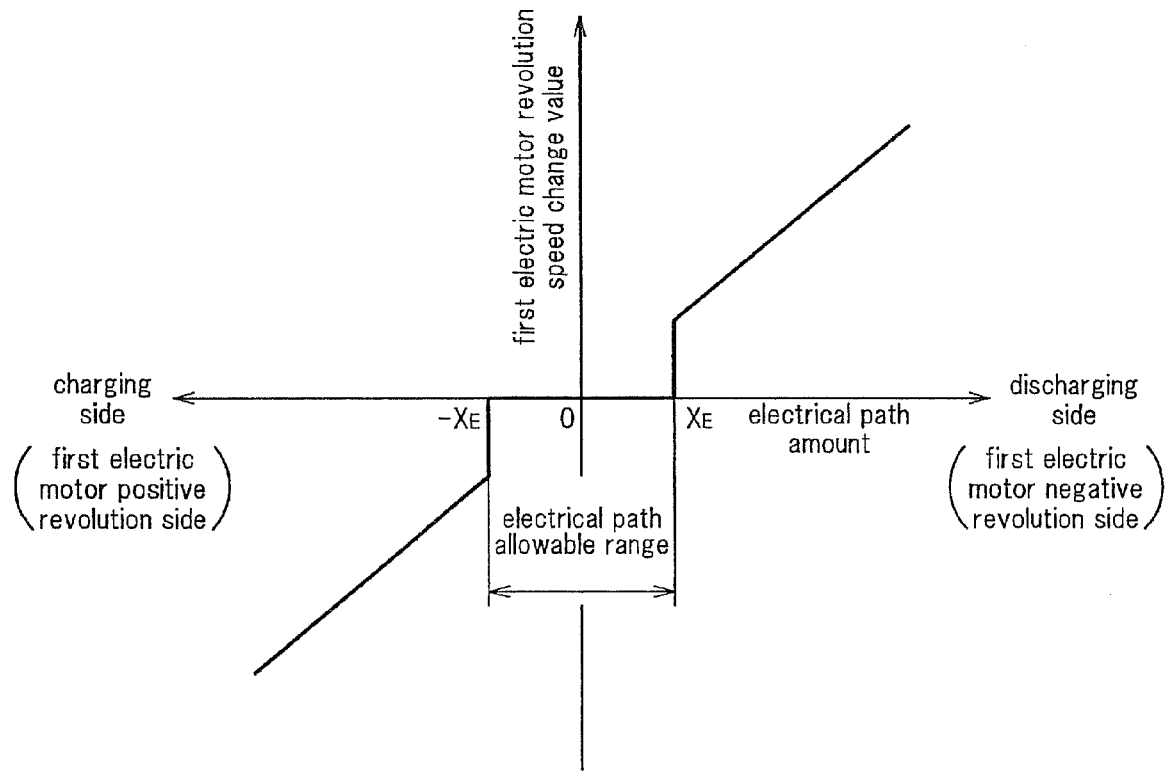
FIG. 9 shows the relationship between a first electric motor revolution speed change value $\Delta N_{M1}$ and an electrical path amount, used by the differential control means in FIG. 5 to correct a first electric motor revolution speed $N_{M1}$ in the direction approaching zero, that relationship having been set in advance.

Specifically, because the differential unit control means 82 increases the transmission efficiency $\eta_{11}$ of the differential unit 11 by bringing the electric power of the first electric motor M1 nearer to zero, the differential unit control means 82 judges whether or not the electric power (electrical path amount) of the first electric motor M1 is within an electrical path allowable range where the transmission efficiency $\eta_{11}$ of the differential unit 11 can be seen as sufficiently high. When that judgment is affirmative, i.e., when the electrical path amount is within the electrical path allowable range, the differential unit control means 82 maintains the present first electric motor revolution speed $N_{M1}$. On the other hand, when that judgment is negative, the differential unit control means 82 determines a first electric motor revolution speed change value $\Delta N_{M1}$ for correcting the first electric motor revolution speed $N_{M1}$ in the direction approaching zero based on the electrical path amount, i.e., the electric power of the first electric motor M1, from the relationship of the electrical path amount and the first electric motor revolution speed change value $\Delta N_{M1}$ that has been stored in advance as shown in FIG. 9, and corrects the first electric motor revolution speed $N_{M1}$ by the first electric motor revolution speed change value $\Delta N_{M1}$ in the direction that brings the first electric motor revolution speed $N_{M1}$ nearer to zero, i.e., the direction that brings the electrical path amount nearer to zero. The relationship of the electrical path amount and the first electric motor revolution speed change value $\Delta N_{M1}$ may be a relationship such that, as shown in FIG. 9, the first electric motor revolution speed change value $\Delta N_{M1}$ increases as the electrical path amount moves toward the discharge side of the accumulation apparatus 94. This relationship may also be such that, as in FIG. 9, although positive and negative of the first electric motor revolution speed change value $\Delta N_{M1}$ reverse at the origin point, the absolute value of the first electric motor revolution speed change value $\Delta N_{M1}$ is fixed regardless of the electrical path amount. When the differential unit control means 82 has corrected the first electric motor revolution speed change value $\Delta N_{M1}$, the differential unit control means 82 again judges whether or not the electric power (electrical path) of the first electric motor M1 is within the electrical path allowable range. In this way, the differential unit control means 82 repeats the judgment of the electric power (electrical path amount) of the first electric motor M1 and correction of the first electric motor revolution speed $N_{M1}$ until that judgment is affirmative.

As described above, the differential unit control means 82 increases the transmission efficiency $\eta_{11}$ of the differential unit 11 by bringing the electric power of the first electric motor M1 nearer to zero, but because the electric power of the first electric motor M1 approaches zero as the first electric motor revolution speed $N_{M1}$ approaches zero, the differential unit control means 82 may also increase the transmission efficiency $\eta_{11}$ of the differential unit 11 by bringing the first electric motor revolution speed $N_{M1}$ nearer to zero. In such a case, the electrical path allowable range in the judgment performed by the differential unit control means 82 is replaced by a first electric motor revolution speed allowable range, which is the allowable range of the first electric motor revolution speed $N_{M1}$, and the differential unit control means 82 judges whether or not the first electric motor revolution speed $N_{M1}$ is within that first electric motor revolution speed allowable range, and in FIG. 9 for determining the first electric motor revolution speed change value $\Delta N_{M1}$, the horizontal axis is changed from the electrical path amount to the first electric motor revolution speed $N_{M1}$.

In this way, by the continuously variable transmission unit control means 80 determining the gear ratio $\gamma_{CVT}$ of the continuously variable transmission unit 20 from the continuously variable transmission unit gear ratio map in FIG. 8, and also the differential unit control means 82 further converging the electrical path amount or the first electric motor revolution speed $N_{M1}$ to zero, the transmission efficiency $\eta_{11}$ of the differential unit 11 is increased.

Figure 10:
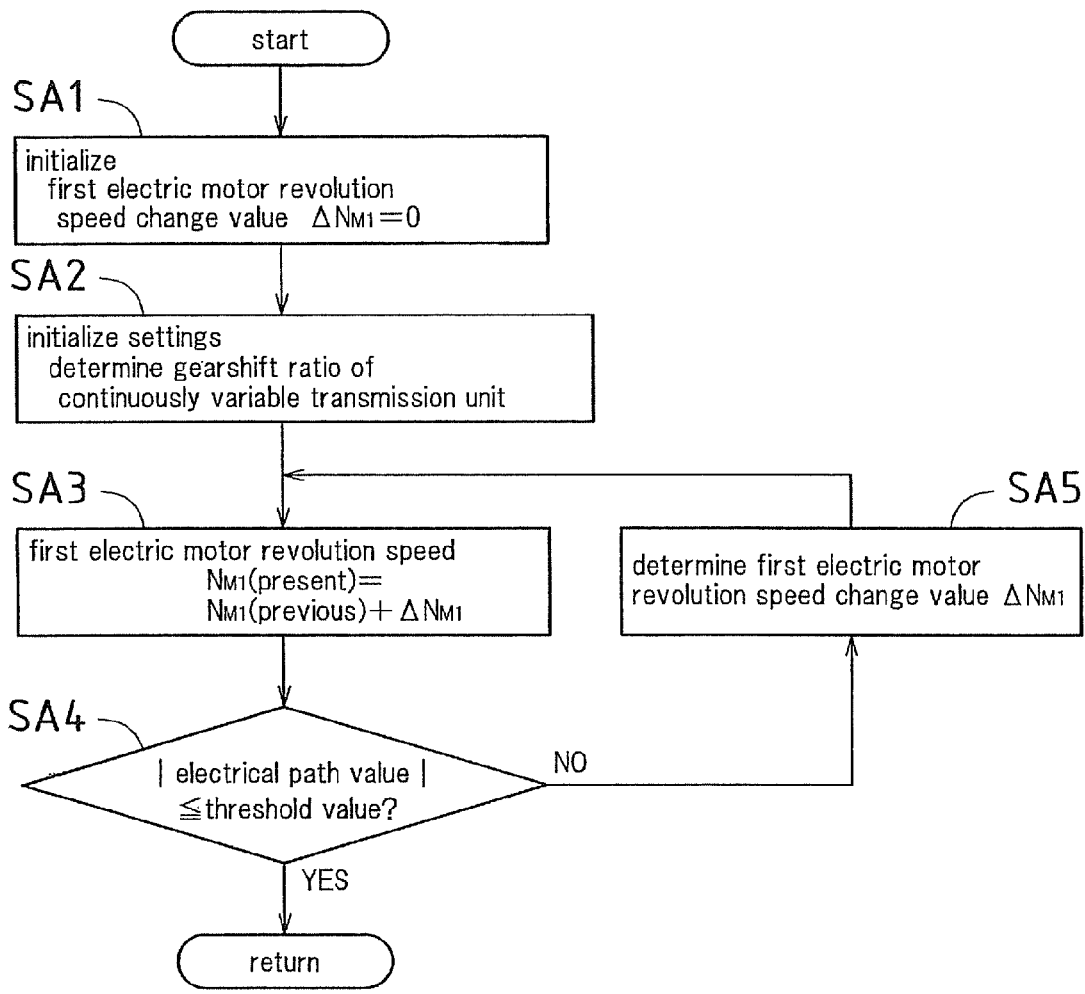
FIG. 10 is a flowchart that illustrates relevant parts of a control operation of the electronic control apparatus in FIG. 3, i.e., a control operation for improving transmission efficiency of a differential unit when the differential unit is in a differential state during engine running, in a first embodiment.

FIG. 10 is a flowchart that illustrates, in this embodiment, relevant parts of a control operation of the electronic control apparatus 60, i.e., a control operation for improving the transmission efficiency $\eta_{11}$ of the differential unit 11 when the differential unit 11 is in a differential state (continuously variable gearshifting state) during engine running. This control operation is repeatedly executed with an extremely short cycle time of, for example, approximately several milliseconds to several tens of milliseconds.

First, in step (below, 'step' is omitted) SA1, the first electric motor revolution speed change value $\Delta N_{M1}$ is initialized. Specifically, the first electric motor revolution speed change value $\Delta N_{M1}$ is set to zero. After SA1, the operation moves to SA2.

In SA2 corresponding to the continuously variable transmission unit control means 80, the gear ratio $\gamma_{CVT}$ of the continuously variable transmission unit 20 is determined based on the vehicle speed V from the continuously variable transmission unit gear ratio map in FIG. 8. Then, the contact diameter (effective diameter) of the input side pulley 40 with the belt 44 and the contact diameter (effective diameter) of the output side pulley 42 with the belt 44 are hydraulically controlled in synchronization such that that gear ratio $\gamma_{CVT}$ is realized. After SA2, the operation moves to SA3.

In SA3, the first electric motor revolution speed $N_{M1}$ is corrected by the first electric motor revolution speed change value $\Delta N_{M1}$ in the direction that brings the first electric motor revolution speed $N_{M1}$ nearer to zero, i.e., the direction that brings the electrical path amount nearer to zero. Specifically, the target first electric motor revolution speed change value $\Delta N_{M1}$ is set/changed to a revolution speed obtained by adding the first electric motor revolution speed change value $\Delta N_{M1}$ to the first electric motor revolution speed $N_{M1}$, and the first electric motor M1 is controlled such that the target first electric motor revolution speed change value $\Delta N_{M1}$ is achieved. After SA3, the operation moves to SA4.

In SA4, a judgment is made of whether or not the electric power (electrical path amount) of the first electric motor M1 is within the electrical path allowable range. For example, the electrical path allowable range includes zero, and the absolute value of an upper limit value and a lower limit value of that range is set to a threshold value $X_E$ that has been determined in advance testing, and a judgment is made of whether or not the absolute value of the electrical path amount is that threshold value $X_E$ or less. Here, the electric power of the first electric motor M1 is used as the electrical path amount, but another physical value may be used as the electrical path amount, such as a control current value of the first electric motor M1. The control current value of the first electric motor M1 is a drive current value (consumed current value) corresponding to the consumed electric power, or a generated electricity current value corresponding to the output electric power. When this judgment is affirmative, i.e., when the electric power (electrical path amount) of the first electric motor M1 is within the electrical path allowable range, this flowchart ends. On the other hand, when this judgment is negative, the operation moves to SA5.

Figure 11:
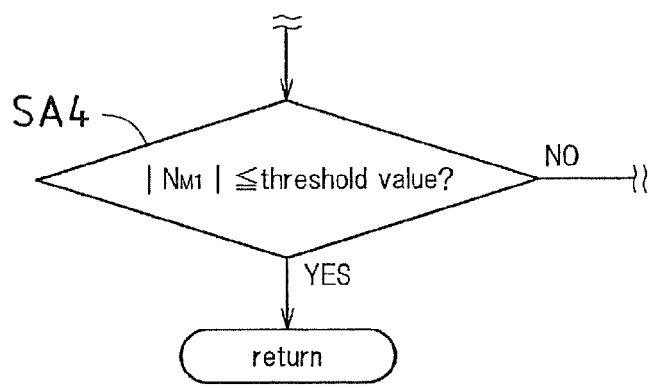
FIG. 11 shows a step that replaces SA4 in FIG. 10.

The judgment subject of SA4 is the electric power (electrical path amount) of the first electric motor M1, but instead the judgment may be performed with respect to the first electric motor revolution speed $N_{M1}$. In this case, in a substituted SA4 as shown in FIG. 11, for example, a judgment is made of whether or not the first electric motor revolution speed $N_{M1}$ is within a first electric motor revolution speed allowable range in which the absolute value of an upper limit value and a lower limit value is set to a threshold value $X_{NM1}$ that has been determined in advance testing, in other words, whether or not the absolute value of the first electric motor revolution speed $N_{M1}$ is the threshold value $X_{NM1}$ or less.

In SA5, the first electric motor revolution speed change value $\Delta N_{M1}$ is determined based on the electrical path amount, i.e., the electric power of the first electric motor M1, from a relationship set in advance of the first electric motor revolution speed change value $\Delta N_{M1}$ and the electrical path amount, as shown in FIG. 9. After SA5, the operation moves to SA3. Above SA1, SA3, SA4, and SA5 correspond to the differential unit control means 82.

Figure 12:
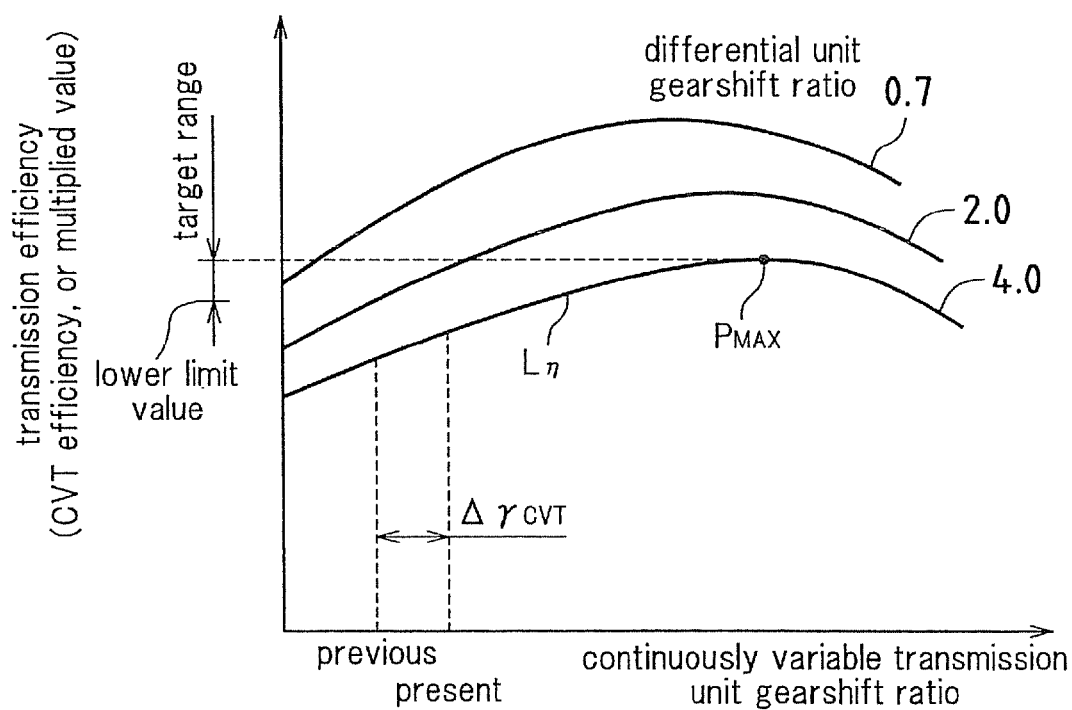
FIG. 12 shows the relationship between a gear ratio of the continuously variable transmission unit and transmission efficiency, used by the continuously variable transmission unit control means to correct the gear ratio of the continuously variable transmission unit.

Also, when the differential unit 11 is in the differential state (continuously variable gearshifting state) during engine running, the continuously variable transmission unit control means 80 determines the gear ratio $\gamma_{CVT}$ of the continuously variable transmission unit 20 from the continuously variable transmission unit gear ratio map in FIG. 8 as the basic gear ratio of the continuously variable transmission unit 20, and then determines (sets) and changes the gear ratio $\gamma_{CVT}$ of the continuously variable transmission unit 20 so as to increase a multiplied value $\eta_P$ (referred to below as 'multiplied efficiency $\eta_P$') of the transmission efficiency $\eta_{11}$ of the output from the engine 8 in the differential unit 11 and the transmission efficiency $\eta_{CVT}$ in the continuously variable transmission unit 20. More specifically, a transmission efficiency multiplied value map as shown in FIG. 12, which shows the relationship of the gear ratio $\gamma_{CVT}$ and the multiplied efficiency $\eta_P$ that changes according to the gear ratio $\gamma 0$ of the differential unit 11, is obtained in testing and stored in advance in the continuously variable transmission unit control means 80, and the continuously variable transmission unit control means 80 detects the gear ratio $\gamma 0$ of the differential unit 11 from the engine revolution speed $N_E$ and the second electric motor revolution speed $N_{M2}$, thus finding the multiplied efficiency $\eta_P$ that corresponds to the present gear ratio $\gamma_{CVT}$ of the continuously variable transmission unit 20 based on the transmission efficiency multiplied value map in FIG. 12 and the detected gear ratio $\gamma 0$. Then, the continuously variable transmission unit control means 80 corrects the gear ratio $\gamma_{CVT}$ relative to the basic gear ratio of the continuously variable transmission unit 20 determined from the continuously variable transmission unit gear ratio map in FIG. 8, and determines (sets) and changes that gear ratio $\gamma_{CVT}$ such that the multiplied efficiency $\eta_P$ increases in the transmission efficiency multiplied value map in FIG. 12. Here, by the gear ratio $\gamma_{CVT}$ of the continuously variable transmission unit 20 being set to the basic gear ratio according to the continuously variable transmission unit gear ratio map in FIG. 8, in the differential unit 11, ideally, the first electric motor revolution speed $N_{M1}$ becomes zero or substantially zero, and the transmission efficiency $\eta_{11}$ is increased, so correction of the gear ratio $\gamma_{CVT}$ relative to the basic gear ratio is performed such that the multiplied efficiency $\eta_{11}$ ($\eta_{11} \times \eta_{CVT}$) becomes higher, but mainly the transmission efficiency $\eta_{CVT}$ (referred to below as 'CVT efficiency $\eta_{CVT}$') of the continuously variable transmission unit 20 becomes higher.

Specifically, after determining the gear ratio $\gamma_{CVT}$ of the continuously variable transmission unit 20 from the continuously variable transmission unit gear ratio map in FIG. 8, the continuously variable transmission unit control means 80 selects a transmission efficiency curve $L\eta$ that corresponds to the present gear ratio $\gamma 0$ of the differential unit 11 from the transmission efficiency multiplied value map of FIG. 12, and makes a judgment of whether or not the multiplied efficiency $\eta_P$ corresponding to the present gear ratio $\gamma_{CVT}$ of the continuously variable transmission unit 20 in the selected transmission efficiency curve $L\eta$ is no greater than a transmission efficiency lower limit determination value that is a predetermined amount lower than a maximum efficiency indicated by point $P_{MAX}$ (see FIG. 12). This transmission efficiency lower limit determination value is a lower limit value of a target range of the multiplied efficiency $\eta_P$ in which the multiplied efficiency $\eta_P$ can be seen to be sufficiently high. When that judgment is negative, i.e., when the multiplied efficiency $\eta_P$ is greater than the transmission efficiency lower limit determination value, the continuously variable transmission unit control means 80 maintains the gear ratio $\gamma_{CVT}$ of the continuously variable transmission unit 20. On the other hand, when that judgment is affirmative, i.e., when the multiplied efficiency $\eta_P$ is not greater than the transmission efficiency lower limit determination value, the continuously variable transmission unit control means 80 obtains the difference between the target gear ratio $\gamma_{CVT}$ corresponding to the point $P_{MAX}$ (see FIG. 12) that indicates maximum efficiency and the present gear ratio $\gamma_{CVT}$, and using that difference as a gear ratio change value $\Delta\gamma_{CVT}$, which is the correction amount of the gear ratio $\gamma_{CVT}$, corrects the gear ratio $\gamma_{CVT}$ of the continuously variable transmission unit 20 by the gear ratio change value $\Delta\gamma_{CVT}$ in the direction that the multiplied efficiency $\eta_P$ increases, i.e., the direction that approaches point $P_{MAX}$. At this time, in order for the gear ratio $\gamma_{CVT}$ of the continuously variable transmission unit 20 to not change greatly, a correction guard value that is the upper limit value of the gear ratio change value $\Delta\gamma_{CVT}$ is set in advance, and the continuously variable transmission unit control means 80 corrects the gear ratio $\gamma_{CVT}$ of the continuously variable transmission unit 20 in a range that the gear ratio $\gamma_{CVT}$ (absolute value) does not exceed that correction guard value. Accordingly, when the absolute value of the gear ratio change value $\Delta\gamma_{CVT}$ obtained from FIG. 12 has exceeded that correction guard value, guard processing that reduces that absolute value to the correction guard value is performed, and then corrects the gear ratio $\gamma_{CVT}$ of the continuously variable transmission unit 20. As shown by way of example in FIG. 12, by the gear ratio $\gamma_{CVT}$ of the continuously variable transmission unit 20 only being corrected by the gear ratio change value $\Delta\gamma_{CVT}$, the multiplied efficiency $\eta_P$ after that correction may in some instances not exceed the transmission efficiency lower limit determination value. When the gear ratio $\gamma_{CVT}$ of the continuously variable transmission unit 20 has been corrected, the continuously variable transmission unit control means 80 again judges whether or not the multiplied efficiency $\eta_P$ is the transmission efficiency lower limit determination value or less. In this way, the continuously variable transmission unit control means 80 repeats judgment of multiplied efficiency $\eta_P$ and correction of the gear ratio $\gamma_{CVT}$ of the continuously variable transmission unit 20.

Correction of the gear ratio $\gamma_{CVT}$ of the continuously variable transmission unit 20 by the continuously variable transmission unit control means 80, as described above, may be performed mainly to make the CVT efficiency $\eta_{CVT}$ of the continuously variable transmission unit 20 higher, so the continuously variable transmission unit control means 80 may use the CVT efficiency $\Theta_{CVT}$ and not the multiplied efficiency $\eta_P$ as its judgment target. In such a case, the transmission efficiency multiplied value map in FIG. 12 is replaced by a continuously variable transmission unit transmission efficiency map in which the CVT efficiency $\eta_{CVT}$ of the continuously variable transmission unit 20 is represented by the vertical axis, and the continuously variable transmission unit control means 80 performs a judgment not with respect to the multiplied efficiency $\eta_P$, but a judgment of whether or not the CVT efficiency $\eta_{CVT}$ that corresponds to the gear ratio $\gamma_{CVT}$ of the continuously variable transmission unit 20 is no greater than a CVT efficiency lower limit determination value that is a predetermined amount lower than the maximum efficiency indicated by the point $P_{MAX}$ (see FIG. 12).

Figure 13:
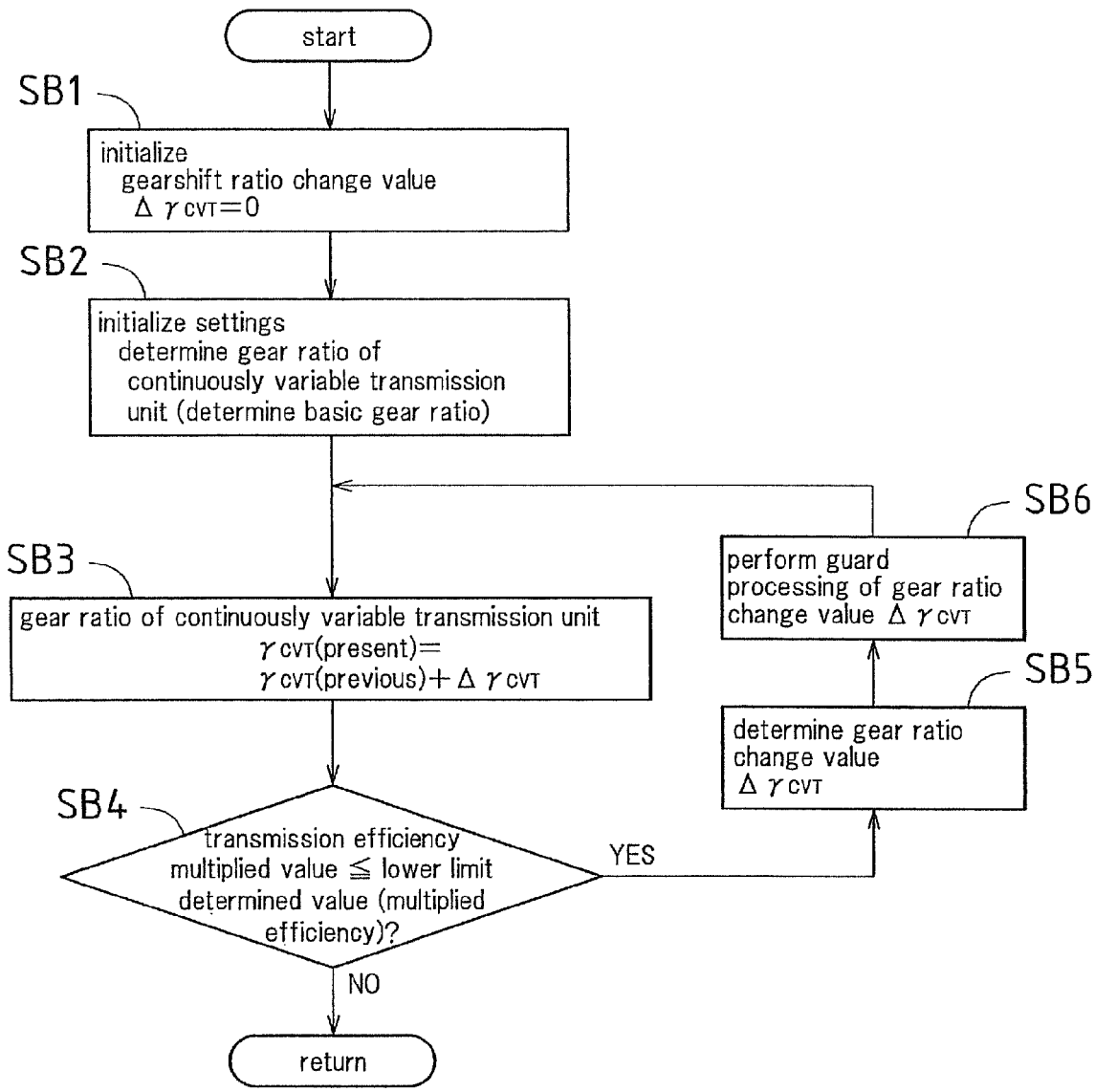
FIG. 13 is a flowchart that illustrates relevant parts of a control operation of the electronic control apparatus in FIG. 3, i.e., a control operation for improving multiplied efficiency when the differential unit is in a differential state during engine running.

FIG. 13 is a flowchart that illustrates, in this embodiment, relevant parts of a control operation of the electronic control apparatus 60, i.e., a control operation for improving the multiplied efficiency $\eta_P$ when the differential unit 11 is in a differential state (continuously variable gearshifting state) during engine running. This control operation is repeatedly executed with an extremely short cycle time of, for example, several milliseconds to several tens of milliseconds.

First, in SB1, the gear ratio change value $\Delta\gamma_{CVT}$, which is the correction amount when the gear ratio $\gamma_{CVT}$ of the continuously variable transmission unit 20 is corrected, is initialized. Specifically, the gear ratio change value $\Delta\gamma_{CVT}$ is set to zero. After SB1, the operation moves to SB2.

In SB2, the gear ratio $\gamma_{CVT}$ of the continuously variable transmission unit 20 is determined based on the vehicle speed V from the continuously variable transmission unit gear ratio map in FIG. 8 as the basic gear ratio of the continuously variable transmission unit 20. After SB2, the operation moves to SB3.

In SB3, the gear ratio $\gamma_{CVT}$ of the continuously variable transmission unit 20 is corrected by the gear ratio change value $\Delta\gamma_{CVT}$ that is set/changed in SB5 and SB6 described below, in the direction that the multiplied efficiency $\eta_P$ increases, i.e., the direction that approaches point $P_{MAX}$ in FIG. 12. Specifically, the target gear ratio $\gamma_{CVT}$ of the continuously variable transmission unit 20 is set/changed to a gear ratio obtained by adding the gear ratio change value $\Delta\gamma_{CVT}$ to the present gear ratio $\gamma_{CVT}$, and in the continuously variable transmission unit 20, the contact diameter (effective diameter) of the input side pulley 40 with the belt 44 and the contact diameter (effective diameter) of the output side pulley 42 with the belt 44 are hydraulically controlled in synchronization such that the target gear ratio $\gamma_{CVT}$ is realized. After SB3, the operation moves to SB4.

In SB4, the transmission efficiency curve L$\eta$ that corresponds to the present gear ratio $\gamma 0$ of the differential unit 11 is selected from the transmission efficiency multiplied value map in FIG. 12, and a judgment is made of whether or not the multiplied efficiency $\eta_P$ that corresponds to the present gear ratio $\gamma_{CVT}$ of the continuously variable transmission unit 20 is no greater than the transmission efficiency lower limit determination value in that selected transmission efficiency curve L$\eta$. Here, fundamentally, in order to lighten the control load when judging whether or not the multiplied efficiency $\eta_P$ has not reached the maximum efficiency in the transmission efficiency multiplied value map in FIG. 12, the transmission efficiency lower limit determination value is used in that judgment. When this judgment is affirmative, i.e., when the multiplied efficiency $\eta_P$ is no greater than the transmission efficiency lower limit determination value, the operation moves to SB5. On the other hand, when this judgment is negative, this flowchart ends.

Figure 14:
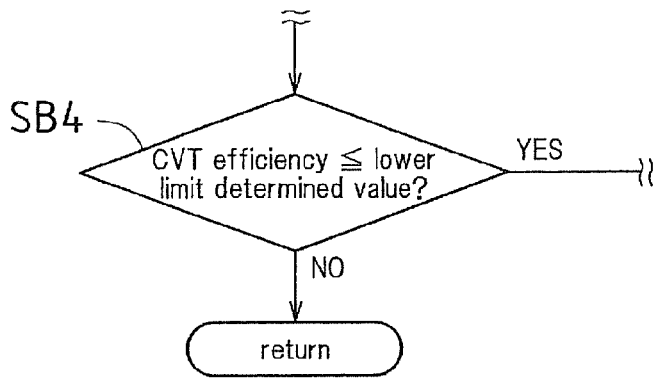
FIG. 14 shows a step that replaces SB4 in FIG. 13.

The judgment target of SB4 is the multiplied efficiency $\eta_P$, but the judgment may be performed with respect to the CVT efficiency $\eta_{CVT}$ of the continuously variable transmission unit 20 instead. In that case, SB4 is substituted as shown in FIG. 14, so that in SB4, a judgment is made of whether or not the CVT efficiency $\eta_{CVT}$ that corresponds to the present gear ratio $\gamma_{CVT}$ of the continuously variable transmission unit 20 is no greater than the CVT efficiency lower limit determination value, based on FIG. 12 as the above continuously variable transmission unit transmission efficiency map in which the vertical axis is the CVT efficiency $\eta_{CVT}$ of the continuously variable transmission unit 20.

In SB5, the difference between the target gear ratio $\gamma_{CVT}$ corresponding to the point $P_{MAX}$ (see FIG. 12) indicating the maximum efficiency and the present gear ratio $\gamma_{CVT}$ is obtained, and the difference is determined to be the gear ratio change value $\Delta\gamma_{CVT}$. After SB5, the operation moves to SB6.

In SB6, the above guard processing of the gear ratio change value $\Delta\gamma_{CVT}$ is performed. Specifically, when the absolute value of the gear ratio change value $\Delta\gamma_{CVT}$ determined in SB5 exceeds the correction guard value set in advance, that absolute value is reduced to the correction guard value and the gear ratio change value $\Delta\gamma_{CVT}$ is corrected with that reduced value. Accordingly, the gear ratio change value $\Delta\gamma_{CVT}$ determined in SB5 is fixed in SB6. After SB6, the operation moves to SB3. Above SB1 to SB6 correspond to the continuously variable transmission unit control means 80.

As one feature of the present embodiment, the continuously variable transmission unit control means 80 is provided with a gear ratio adjusting means 84 for adjusting the differential operation of the differential unit 11 and the gearshift operation of the continuously variable transmission unit 20, according to when the differential of the differential unit 11 is limited by engaging the switching clutch C0 or the switching brake B0 provided in the differential unit 11, and when the differential of the differential unit 11 is not limited due to not engaging (releasing) the switching clutch C0 or the switching brake B0. The gear ratio adjusting means 84 provides a function to adjust the overall gear ratio of the drive apparatus 10 by controlling the gear ratio $\gamma 0$ of the differential unit 11 and the gear ratio $\gamma_{CVT}$ of the continuously variable transmission unit 20.

Specifically, when the differential of the differential unit 11 is limited, the gear ratio adjusting means 84 sets the operation point of the engine 8 by adjusting the gear ratio of the continuously variable transmission unit 20 to realize a target output of the engine 8. On the other hand when the differential of the differential unit 11 is not limited, the gear ratio adjusting means 84 sets the operation point of the engine 8 by adjusting the total gear ratio $\gamma T$ of the gear ratio of the differential unit 11 and the gear ratio of the continuously variable transmission unit 20 to realize a target output of the engine 8.

Figure 15:
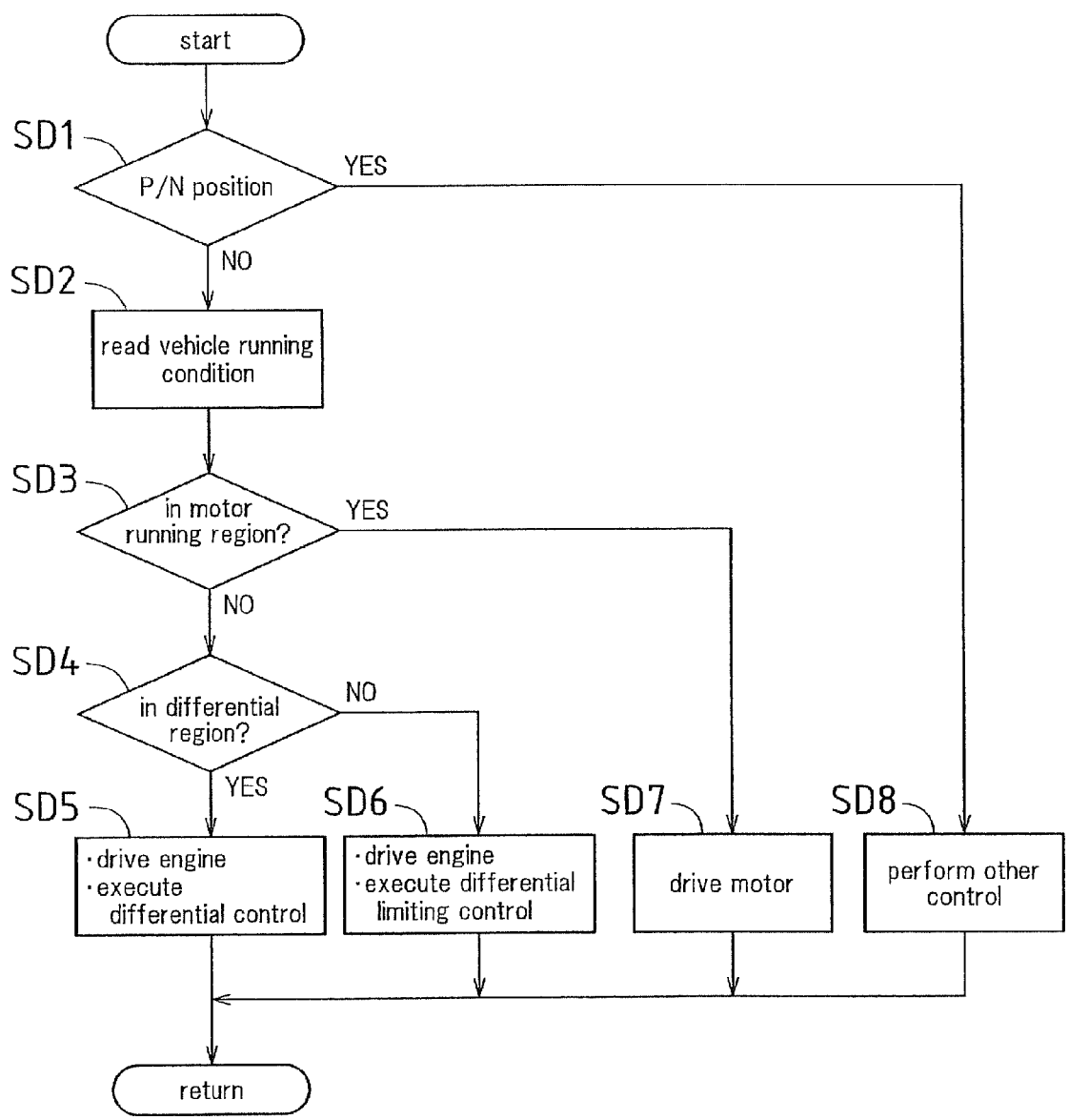
FIG. 15 is a flowchart that shows the operating procedure for adjusting the differential operation of the differential unit and the gearshift operation of the continuously variable transmission unit, performed by the gear ratio adjusting means.

FIG. 15 is a flowchart that shows the operating procedure for adjusting the differential operation of the differential unit 11 and the gearshift operation of the continuously variable transmission unit 20, performed by the gear ratio adjusting means 84. Below is a general description of the adjusting operation by the gear ratio adjusting means 84 following this flowchart.

First, in SD1, a determination is made of whether or not the shift position $P_{SH}$ selected with the shift lever 68 is the parking position (P position) or the neutral position (N position). This is judged based on a signal from the shift position sensor, for example.

Then, when the shift position $P_{SH}$ is selected at the parking position or the neutral position, so a determination of YES has been made in SD1, the operation moves to SD8, and a control operation according to that shift position $P_{SH}$ is performed. That is, both the switching clutch C0 and the switching brake B0 are released so that a freely rotating state is established for both the first electric motor M1 and the second electric motor M2, thus establishing a state in which the motive power transmission path in the drive apparatus 10 has been cut off. Also, when the parking position has been selected, in addition to the cutoff state of the motive power transmission path, the output shaft 22 is locked by a parking lock mechanism.

On the other hand, when the shift position $P_{SH}$ is not selected at either the parking position or the neutral position, so a determination of NO has been made in SD1, the operation moves to SD2. In SD2, the present vehicle running condition is read. Examples of this running condition include the vehicle speed and the accelerator opening degree. These are read from output signals from a vehicle speed sensor and an accelerator opening degree sensor.

Then, moving to SD3, from the drive power source switching line diagram shown in FIG. 7, a determination is made of whether or not the present vehicle running condition is in the motor running region. When the vehicle speed is comparatively low and the accelerator opening degree is comparatively small and thus the running condition is in the motor running region, a determination of YES is made in SD3, the operation moves to SD7, entering a running mode of running by motor drive, i.e., drive of the second electric motor M2. In this case, the number of engine 8 revolutions is set to '0', avoiding so-called engine drag. Also, as an exception, there are also instances where the switching clutch C0 is engaged, and the first electric motor M1 and the second electric motor M2 are both rotationally controlled, so that running is performed using the drive power of both electric motors 1 and 2.

When the present vehicle running condition is not in the motor running region but in the engine running region, a determination of NO is made in SD3, the operation moves to SD4, and from the drive power source switching line diagram shown in FIG. 7, a determination is made of whether or not the present vehicle running condition is in the differential region (region where both the switching clutch C0 and the switching brake B0 are both released) of the differential unit 11. That is, a determination is made of whether or not in a continuously variable control region (free region) in FIG. 7.

When the vehicle running condition is in the continuously variable control region, so a determination of YES has been made in SD4, the operation moves to SD5, where the engine 8 is driven, and differential control of the differential unit 11 is carried out. That is, as described above, the gear ratio of the differential unit 11 is adjusted with rotational control of the first electric motor M1 and the second electric motor M2, and the total gear ratio γT is adjusted by adjusting the gear ratio of the continuously variable transmission unit 20. As the adjusting operation of the total gear ratio γT in this case, with an operation similar to the gear ratio control by the continuously variable transmission unit control means 80 described above, correction of the gear ratio $\gamma_{CVT}$ relative to the basic gear ratio of the continuously variable transmission unit 20 determined from the continuously variable transmission unit gear ratio map is performed such that the multiplied efficiency $\eta_P$ in the transmission efficiency multiplied value map in FIG. 12 increases, and that gear ratio $\gamma_{CVT}$ is determined (set) and changed. In this way, for example, by setting the gear ratio $\gamma_{CVT}$ of the continuously variable transmission unit 20 to the basic gear ratio according to the continuously variable transmission unit gear ratio map in FIG. 8, in the differential unit 11, ideally, the first electric motor revolution speed NM1 becomes zero or substantially zero, and the transmission efficiency $\eta_{11}$ is increased.

On the other hand, when the vehicle running condition is not in a continuously variable control region, i.e., is in a C0 lock region or a B0 lock region, a determination of NO is made in SD4, and moving to SD6, the engine 8 is driven and the differential operation of the differential unit 11 is limited. That is, when the vehicle running condition is in a C0 lock region, the differential unit sun gear S0 and the differential unit carrier CA0 are linked due to engagement of the switching clutch C0, and the power distribution mechanism 16 enters a non-differential state in which the differential unit sun gear S0, the differential unit carrier CA0, and the differential unit ring gear R0 rotate as a single body. Alternatively, when the vehicle running condition is in a B0 lock region, rotation of the differential unit sun gear S0 is stopped due to engagement of the switching brake B0, establishing a non-differential state in which the power distribution mechanism 16 functions as an overdrive mechanism.

When the power distribution mechanism 16 is put in a differential state in this manner, a state is established in which the electrical path is set to about '0', and the motive power transmission efficiency across the drive wheels 38 from the differential unit 11 has been set to maximum efficiency, so that optimal specific fuel consumption can be realized. Specifically, by operation similar to the gear ratio control by the continuously variable transmission unit control means 80 described above, when the switching brake B0 has been engaged, the first electric motor M1 is kept at the mechanical lock point, rotation of the first electric motor M1 is stopped, and the continuously variable transmission unit control means 80 determines (sets) the gear ratio $\gamma_{CVT}$ of the continuously variable transmission unit 20 based on the vehicle speed V from the continuously variable transmission unit gear ratio map shown in FIG. 8 that determines the relationship of the vehicle speed V and the gear ratio $\gamma_{CVT}$ of the continuously variable transmission unit 20. Also, when the switching clutch C0 is engaged, a state is established in which the first electric motor M1 rotates as a single body with the input shaft 14, and the gear ratio $\gamma_{CVT}$ is set to a smaller gear ratio than when the switching brake B0 has been engaged. At this time, because the switching clutch C0 is engaged at a stage where the accelerator opening degree is increased, it is possible to reduce the reactive force torque of the first electric motor M1, so a size reduction of the first electric motor M1 can be achieved.

Figure 16:
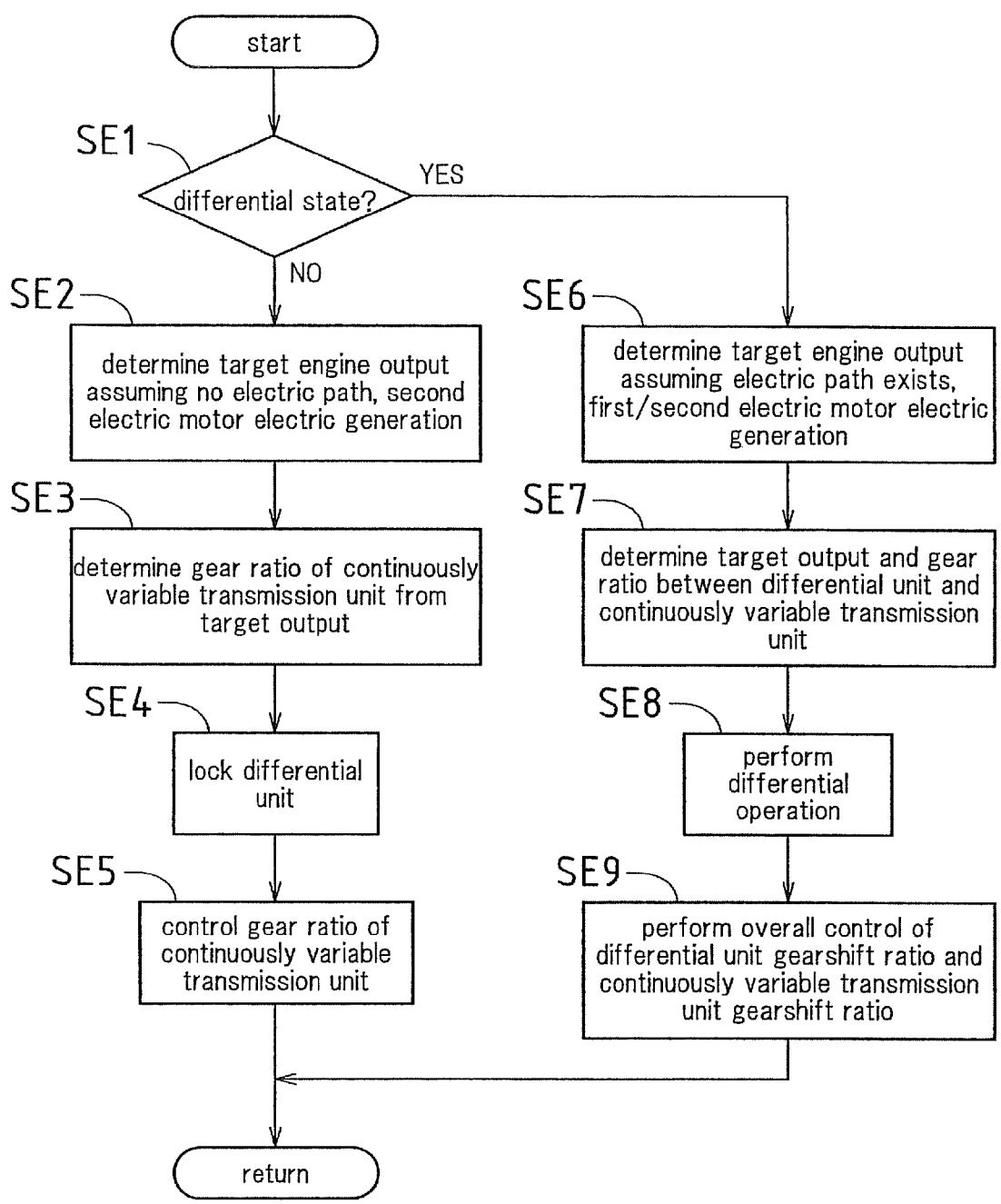
FIG. 16 is a flowchart that shows the procedure of an adjusting operation of the overall gear ratio of the drive apparatus.

FIG. 16 is a flowchart that shows the procedure of an adjusting operation of the overall gear ratio of the drive apparatus 10 according to the determination (determination in SD4) of whether or not in a differential region of the differential unit 11, as described above (corresponding to operation of SD4 to SD6 in the flowchart in FIG. 15).

First, in SE1, a determination is made of whether or not the present vehicle running condition (vehicle speed or accelerator opening degree) is in a differential region of the differential unit 11, and if not, so that a determination of NO has been made, the operation moves to SE2, and the target output of the engine 8 is determined, assuming that the electrical path is absent, and the electric power necessary for the vehicle will be supplied by the second electric motor M2. That is, the target output of the engine 8 is determined by adding the output for obtaining the electric power to be generated by the second electric motor M2 to the requested output requested by the accelerator opening degree. The operation point of the engine 8 is set by adjusting the gear ratio of the continuously variable transmission unit 20 so that this target output is obtained.

Afterward, in SE3, as described above, the gear ratio of the differential unit 11 is fixed due to engagement of the switching clutch C0 or the switching brake B0, so the gear ratio of the continuously variable transmission unit 20 is physically determined, and according to that gear ratio, the gear ratio $\gamma_{CVT}$ of the continuously variable transmission unit 20 is determined.

Then, moving to SE4, due to engagement of the switching clutch C0 or the switching brake B0, a differential limiting operation (differential unit locking) of the differential unit 11 is executed. Accordingly, in SE5, gearshift operation of the continuously variable transmission unit 20 is performed such that the gear ratio $\gamma_{CVT}$ obtained in SE3 is obtained.

On the other hand, in SE1, when the present vehicle running condition (vehicle speed or accelerator opening degree) is in a differential region of the differential unit 11, so that a determination of YES has been made, the operation moves to SE6. In SE6, the target output of the engine 8 is determined, assuming that the electrical path is present, and the electric power necessary for the vehicle will be supplied by the first electric motor M1 and the second electric motor M2. That is, the target output of the engine 8 is determined by adding the output for obtaining the electric power to be generated by the first electric motor M1 and the second electric motor M2 to the requested output requested by the accelerator opening degree. The operation point of the engine 8 is set by adjusting the gear ratio of the differential unit 11 and the gear ratio of the continuously variable transmission unit 20 so that this target output is obtained.

In this case, allocation of the gear ratio $\gamma 0$ of the differential unit 11 and the gear ratio $\gamma_{CVT}$ of the continuously variable transmission unit 20 is determined from the control operation of the continuously variable transmission unit control means 80 as described above (SE7). That is, the continuously variable transmission unit control means 80 corrects the gear ratio $\gamma_{CVT}$ relative to the basic gear ratio of the continuously variable transmission unit 20 determined from the continuously variable transmission unit gear ratio map in FIG. 8, and determines (sets) and changes that gear ratio $\gamma_{CVT}$ such that the multiplied efficiency $\eta_P$ increases in the transmission efficiency multiplied value map in FIG. 12.

Then, moving to SE8, the differential operation of the differential unit 11 is executed with the engine 8 in a driven state. Accordingly, in SE9, the gearshift operation of the continuously variable transmission unit 20 is performed such that the gear ratio $\gamma_{CVT}$ obtained in SE7 is obtained, and thus, the total gear ratio $\gamma T$ of the gear ratio $\gamma 0$ of the differential unit 11 and the gear ratio $\gamma_{CVT}$ of the continuously variable transmission unit 20 is established.

<Effects>

According to the present embodiment the following effects (A1) to (A-9) are obtained.

(A-1) It can be said that the continuously variable transmission unit control means 80 that determines the gear ratio $\gamma_{CVT}$ of the continuously variable transmission unit 20 from FIG. 8 sets the gear ratio $\gamma_{CVT}$ of the continuously variable transmission unit 20 based on the vehicle speed V and the combustion efficiency optimal line $L_{EF}$ such that the engine operation point $P_{EG}$ follows that combustion efficiency optimal line $L_{EF}$, so in any of a state in which the switching clutch C0 is engaged, a state in which the switching brake B0 is engaged, and a state in which the switching clutch C0 and the switching brake B0 are both released, the engine 8 can be operated with optimal specific fuel consumption, and a decrease in fuel efficiency caused by the operation state of the engine 8 can be suppressed. Also, because the continuously variable transmission unit 20 that can continuously change the gear ratio $\gamma_{CVT}$ constitutes a part of the motive power transmission path between the differential unit 11 and the drive wheels 38, by changing the gear ratio $\gamma_{CVT}$ of the continuously variable transmission unit 20 without the first electric motor revolution speed $N_{M1}$ being adjusted, it is possible for the engine revolution speed $N_E$ to not be restricted by the vehicle speed V, and it is possible to operate the engine 8 such that the engine operation point $P_{EG}$ follows the combustion efficiency optimal line $L_{EF}$ while keeping the differential unit 11 in a predetermined differential state with a sufficiently high transmission efficiency $\eta_{11}$.

(A-2) The differential unit control means 82 controls the first electric motor revolution speed $N_{M1}$ so as to increase the transmission efficiency $\eta_{11}$ of the output from the engine 8 in the differential unit 11 to determine and change the gear ratio $\gamma 0$ of the differential unit 11, so a decrease in fuel efficiency caused by a decrease in the transmission efficiency $\eta_{11}$ of the differential unit 11 can be suppressed.

(A-3) The differential unit control means 82 increases the transmission efficiency $\eta_{11}$ of the differential unit 11 by bringing the electric power of the first electric motor M1 nearer to zero, so if that electric power has a constant voltage, by detecting the control current value of that electric power, the transmission efficiency $\eta_{11}$ can easily be increased.

(A-4) The differential unit control means 82 may increase the transmission efficiency $\eta_{11}$ of the differential unit 11 by bringing the first electric motor revolution speed $N_{M1}$ nearer to zero, and in such a case, by detecting the first electric motor revolution speed $N_{M1}$, the transmission efficiency $\eta_{11}$ can easily be increased.

(A-5) The continuously variable transmission unit control means 80 determines (sets) and changes the gear ratio $\gamma_{CVT}$ of the continuously variable transmission unit 20 so as to increase the multiplied efficiency $\eta_P$, which is a multiplied value of the transmission efficiency $\eta_{11}$ of the output from the engine 8 in the differential unit 11 and the transmission efficiency $\gamma_{CVT}$ in the continuously variable transmission unit 20, so a decrease in fuel efficiency due to a decrease in transmission efficiency of the differential unit 11 or the continuously variable transmission unit 20 can be suppressed.

(A-6) The continuously variable transmission unit control means 80 performs correction of the gear ratio $\gamma_{CVT}$ relative to the basic gear ratio of the continuously variable transmission unit 20 determined from the continuously variable transmission unit gear ratio map in FIG. 8 such that the multiplied efficiency $\eta_P$ (CVT efficiency $\eta_{CVT}$) increases, and determines (sets) and changes that gear ratio $\eta_{CVT}$, so the correction starts from a state in which the multiplied efficiency $\eta_P$ is somewhat high from the determination of the basic gear ratio from FIG. 8, and therefore it is possible to efficiently correct the gear ratio $\gamma_{CVT}$ of the continuously variable transmission unit 20.

(A-7) The continuously variable transmission unit control means 80 makes a judgment of whether or not the CVT efficiency $\eta_{CVT}$ corresponding to the present gear ratio $\gamma_{CVT}$ of the continuously variable transmission unit 20 is no greater than a CVT efficiency lower limit determination value that is a predetermined amount lower than a maximum efficiency indicated by point $P_{MAX}$ (see FIG. 12), and when that judgment is affirmative, corrects the gear ratio $\gamma_{CVT}$ of the continuously variable transmission unit 20 by the gear ratio change value $\Delta\gamma_{CVT}$ in the direction approaching point $P_{MAX}$, so it is possible to lighten the control load due to the correction ending when the transmission efficiency $\eta_{CVT}$ of the continuously variable transmission unit 20 has become sufficiently high.

(A-8) The correction guard value is provided in advance, and the continuously variable transmission unit control means 80 corrects the gear ratio $\gamma_{CVT}$ of the continuously variable transmission unit 20 in a range that the gear ratio change value $\Delta\gamma_{CVT}$ (absolute value) does not exceed that correction guard value, so large changes in the gear ratio $\gamma_{CVT}$ of the continuously variable transmission unit 20 are avoided, and thus it is possible to not make vehicle passengers feel uncomfortable.

(A-9) The transmission efficiency multiplied value map as shown in FIG. 12 is obtained in testing, and stored in advance in the continuously variable transmission unit control means 80, and the continuously variable transmission unit control means 80 corrects the gear ratio $\gamma_{CVT}$ relative to the basic gear ratio of the continuously variable transmission unit 20 based on that transmission efficiency multiplied value map, and determines (sets) and changes that gear ratio $\gamma_{CVT}$, so the control load can be lightened compared to calculating the multiplied efficiency $\eta_P$ on a case-by-case basis.

Second Embodiment

Next is a description of a second embodiment. The present embodiment is characterized by the operation when engaging the switching clutch C0 and the switching brake B0 that are provided in the differential unit 11. Otherwise, the configuration of the drive apparatus 10 and the control operation are the same as in the above first embodiment, so here only the operation when engaging the switching clutch C0 and the switching brake B0 will be described.

In the present embodiment, the gear ratio adjusting means 82 changes the gear ratio of the continuously variable transmission unit 20 such that the total gear ratio $\gamma T$ is not changed when limiting the differential of the differential unit 11 (when engaging the switching clutch C0 or the switching brake B0). That is, prior to engaging the switching clutch C0 or the switching brake B0, the gear ratio of the continuously variable transmission unit 20 is changed, and thus, the revolution speed of the rotating elements (the differential unit sun gear S0, the differential unit carrier CA0, and the differential unit ring gear R0) of the differential unit 11 is made to approach the revolution speed when the differential of the differential unit 11 is limited, so that the gearshift operation when limiting the differential of the differential unit 11 can be performed smoothly. In other words, during the course of switching between the state in which the differential of the differential unit 11 is limited and the state in which the differential is not limited, the gear ratio of the differential unit 11 and the gear ratio of the continuously variable transmission unit 20 are changed at about the same time, such that the number of engine 8 revolutions does not change.

Figure 17:
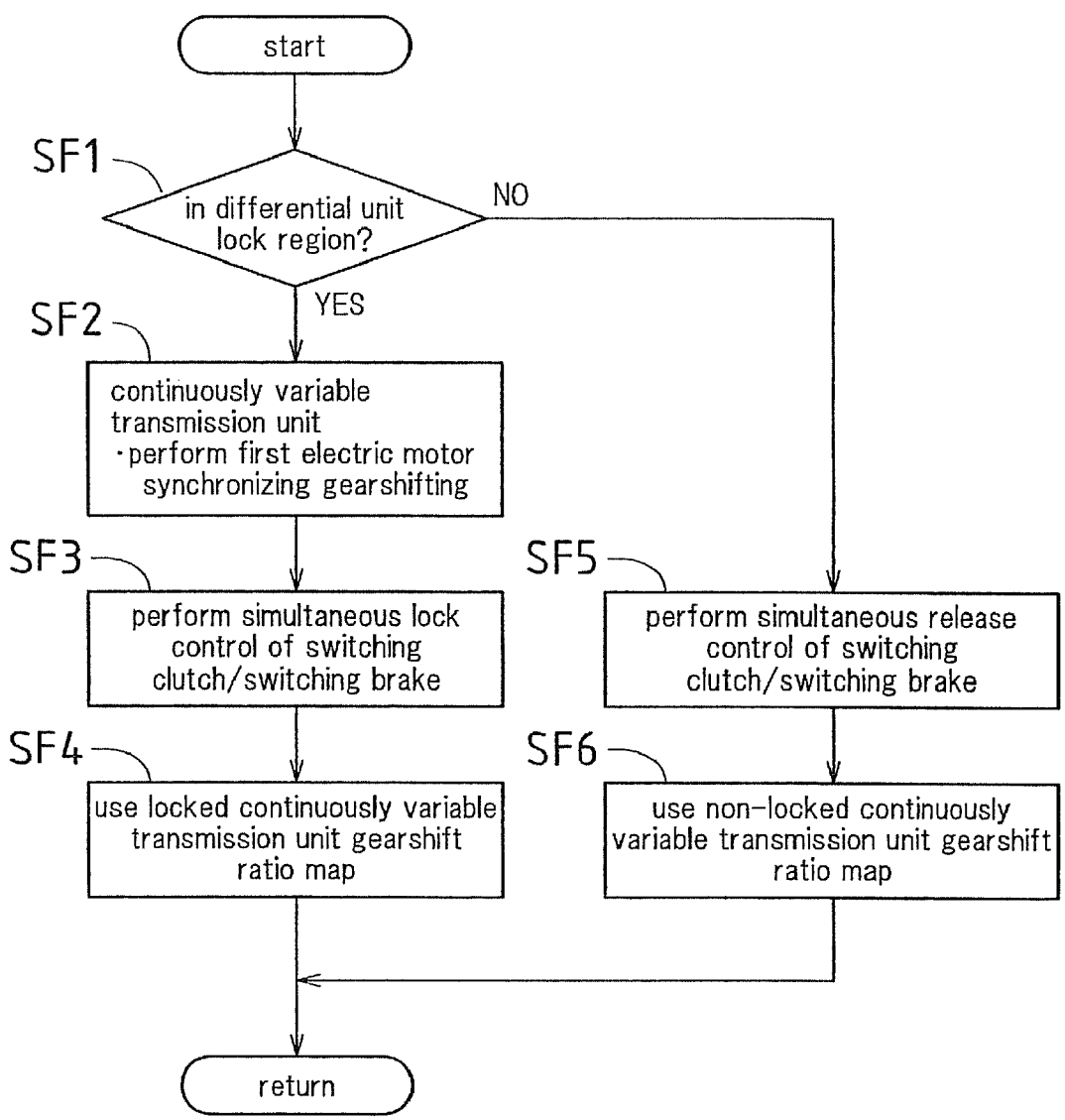
FIG. 17 is a flowchart that shows an operating procedure when limiting the differential of the differential unit, in a second embodiment.

FIG. 17 is a flowchart that shows the operating procedure when limiting the differential of the differential unit 11. Below is a general description of the operation when limiting the differential of the differential unit 11, following this flowchart.

First, in SF1, from the drive power source switching line diagram shown in FIG. 7, a determination is made of whether or not the present vehicle running condition is in a lock region (switching clutch C0 or switching brake B0 engagement region) of the differential unit 11. That is, a determination is made of whether or not in a lock region in FIG. 7.

When the vehicle running condition is in a lock region, and so a determination of YES has been made in SF1, the operation moves to SF2, where synchronizing gearshifting of the continuously variable transmission unit 20 and the first electric motor M1 is performed. That is, from the determination results of whether the present vehicle running condition is in a region where the switching clutch C0 is engaged or in a region where the switching brake B0 is engaged from the drive power source switching line diagram shown in FIG. 7, synchronizing gearshifting of the continuously variable transmission unit 20 and the first electric motor M1 is performed such that the number of revolutions of the first electric motor M1 in this engaged state that has been determined is obtained. The details of this gearshift operation will be described later using the flowchart shown in FIG. 18.

Afterward, the operation moves to SF3, and lock control according to the present vehicle running condition, i.e., an engaging operation of the switching clutch C0 or an engaging operation of the switching brake B0, is executed. Afterward, the operation moves to SF4, and applying a gear ratio map that differs between a case where the switching clutch C0 is engaged and a case where the switching brake B0 is engaged when executing the gearshift operation of the continuously variable transmission unit 20, the gearshift operation of the continuously variable transmission unit 20 is performed according to that gear ratio map.

Specifically, when engaging the switching clutch C0, the fixed gear ratio is '1.0', for example, so the continuously variable transmission unit 20 sets that to, for example, a low gear ratio compared to when in a non-locked state. On the other hand, when engaging the switching brake B0, the fixed gear ratio is '0.696', for example, so the continuously variable transmission unit 20 sets that to, for example, a high gear ratio compared to when in a non-locked state.

When the vehicle running condition is not in a lock region, and so a determination of NO has been made in SF1, the operation moves to SF5, and the switching clutch C0 and the switching brake B0 are both put in a released state (non-locked state). Afterward, the operation moves to SF6, and applying a gear ratio map for case where the switching clutch C0 and the switching brake B0 are both put in a released state when executing the gearshift operation of the continuously variable transmission unit 20, that is, a case of non-differential limiting of the differential unit 11, the gearshift operation of the continuously variable transmission unit 20 is performed according to that gear ratio map, and along with the continuously variable gearshift operation of the differential unit 11, all-region continuously variable gearshifting is realized.

Figure 18:
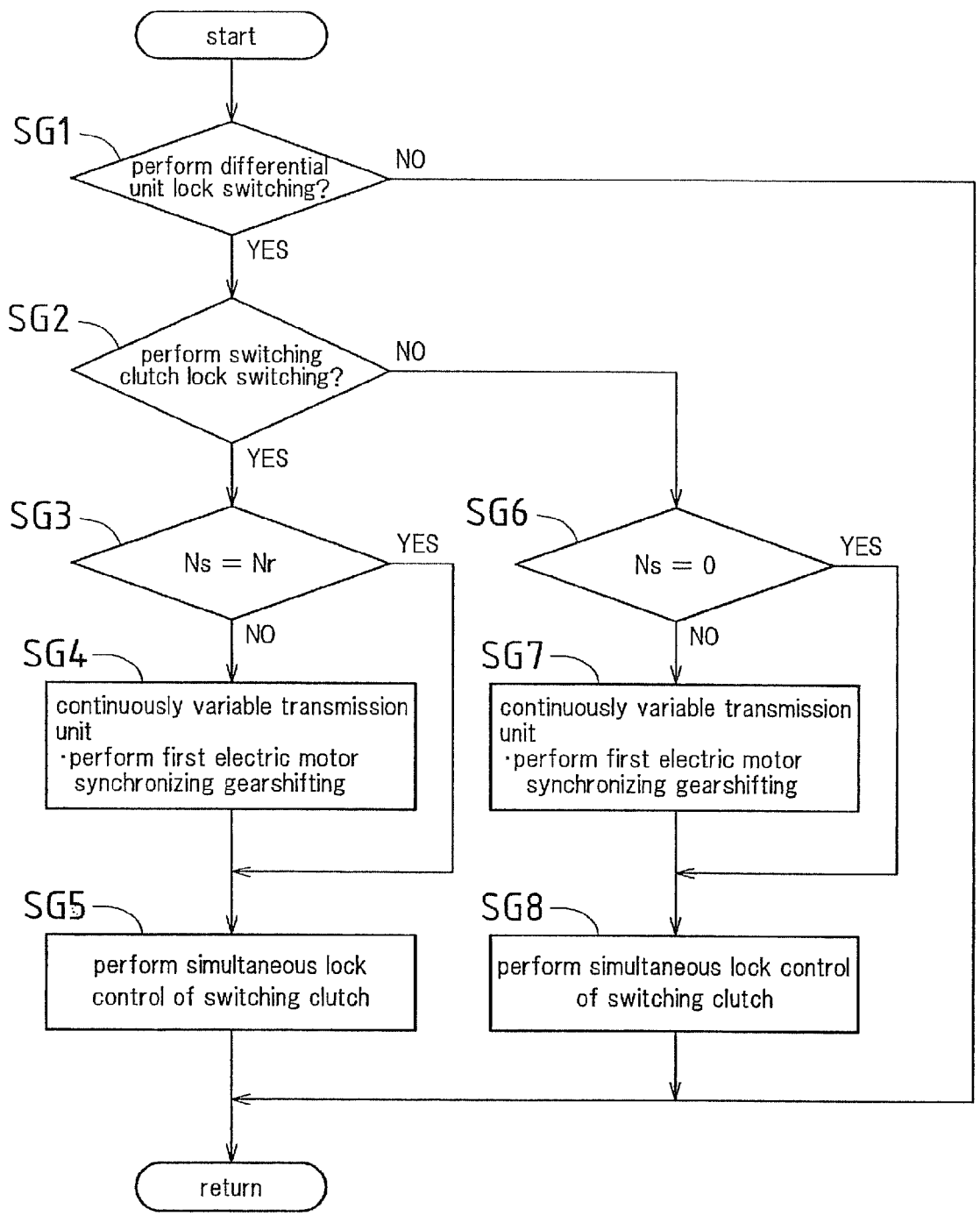
FIG. 18 is a flowchart that shows a more specific operating procedure when limiting the differential of the differential unit, in the second embodiment.
Figure 19A:
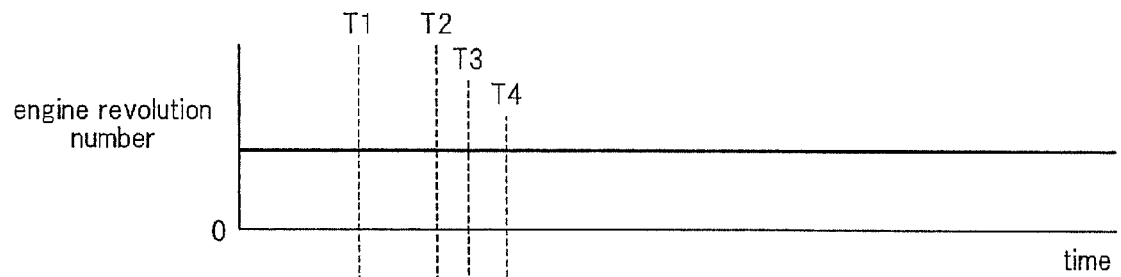
FIGS. 19A to 19D are timing charts that show the state of change of each of the number of engine revolutions, the number of differential unit ring gear revolutions, the number of first electric motor revolutions, and hydraulic pressure for engaging a switching clutch, when performing an engaging operation of the switching clutch from a state in which the number of differential unit sun gear revolutions is higher than the number of differential unit ring gear revolutions.
Figure 19B:
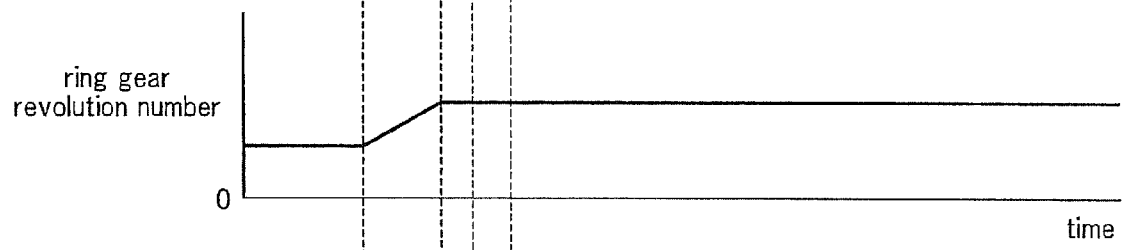
Figure 19C:
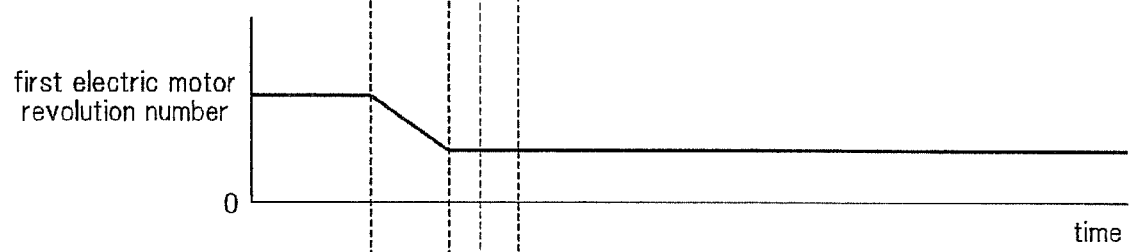
Figure 19D:
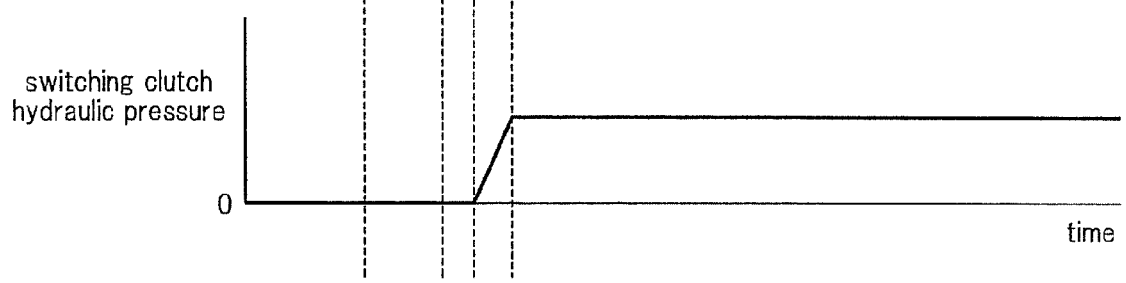

FIG. 18 is a flowchart that more specifically shows the operating procedure when limiting the differential of the differential unit 11 shown in FIG. 17.

First, in SG1, from the drive power source switching line diagram shown in FIG. 7, a determination is made of whether or not lock switching (engaging the switching clutch C0 or switching brake B0) of the differential unit 11 is necessary. Here, when it has been determined that lock switching of the differential unit 11 is not necessary (when a determination of NO has been made), this routine is ended without performing switching of the differential unit 11.

On the other hand, when it has been determined that lock switching of the differential unit 11 is necessary (when a determination of YES has been made), the routine moves to SG2, and a lock switching determination of the switching clutch C0 is performed. That is, a determination is made of whether or not necessary differential 11 lock switching is engagement of the switching clutch C0.

When the differential 11 lock switching determination is engagement of the switching clutch C0, a YES determination is made in SG2 and the routine moves to SG3. In SG3, synchronizing gearshifting of the continuously variable transmission unit 20 and the first electric motor M1 is performed such that the number of revolutions of the electric motor M1 in the case of engaging the switching clutch C0 is obtained. That is, synchronizing gearshifting is performed without changing the number of engine revolutions such that the number of revolutions ($N_s$) of the differential unit sun gear S0 matches the number of revolutions ($N_r$) of the differential unit ring gear R0, and a determination is made of whether or not $N_s$ matches $N_r$. In other words, when the switching clutch C0 has been engaged at the present time, a determination is made of whether or not a state is established in which the number of engine revolutions will not change.

When the number of revolutions ($N_s$) of the differential unit sun gear S0 does not match the number of revolutions ($N_r$) of the differential unit ring gear R0, and so a NO determination was made in SG3, the routine moves to SG4, and synchronizing gearshifting of the continuously variable transmission unit 20 and the first electric motor M1 is performed.

Specifically, when the number of revolutions ($N_s$) of the differential unit sun gear s0 is higher than the number of revolutions ($N_r$) of the differential unit ring gear r0, while downshifting the continuously variable transmission unit 20 to increase the number of revolutions ($N_r$) of the differential unit ring gear r0, at the same time the number of revolutions ($N_s$) of the differential unit sun gear s0 is reduced with the first electric motor M1, thus performing control to eliminate the difference between $N_s$ and $N_r$.

Conversely, when the number of revolutions ($N_s$) of the differential unit sun gear s0 is less than the number of revolutions ($N_r$) of the differential unit ring gear r0, while upshifting the continuously variable transmission unit 20 to decrease the number of revolutions ($N_r$) of the differential unit ring gear r0, at the same time the number of revolutions ($N_s$) of the differential unit sun gear s0 is increased with the first electric motor M1, thus performing control to eliminate the difference between $N_s$ and $N_r$. In other words, when switching the differential limiting state of the differential unit 11 to the low side, the gear ratio of the continuously variable transmission unit 20 is set to a small deceleration ratio relative to a maximum deceleration ratio.

When the number of revolutions ($N_s$) of the differential unit sun gear S0 matches the number of revolutions ($N_r$) of the differential unit ring gear R0, and so a YES determination was made in SG3, after control has been performed with SG4 to eliminate a difference between the number of revolutions ($N_s$) of the differential unit sun gear S0 and the number of revolutions ($N_r$) of the differential unit ring gear R0, the routine moves to SG5. In SG5, a lock control (engaging operation) of the switching clutch C0 is performed. When this engaging operation of the switching clutch C0 is performed, the number of revolutions ($N_s$) of the differential unit sun gear S0 and the number of revolutions ($N_r$) of the differential unit ring gear R0 already match, so this switching operation can be continuously performed, a shock that accompanies the engaging operation of the switching clutch C0 can be avoided, and thus it is possible to avoid a worsening of drivability.

On the other hand, in SG2, when the differential 11 lock switching determination was engagement of the switching brake B0, a NO determination is made in SG2 and the routine moves to SG6. In SG6, synchronizing gearshifting of the continuously variable transmission unit 20 and the first electric motor M1 is performed such that the number of revolutions of the electric motor M1 in the case of engaging the switching brake B0 (number of engine revolutions '0') is obtained. That is, synchronizing gearshifting is performed without changing the number of engine revolutions such that the number of revolutions ($N_s$) of the differential unit sun gear s0 becomes a number of revolutions '0', and a determination is made of whether or not the number of revolutions ($N_s$) of the differential unit sun gear s0 is a number of revolutions '0'. In other words, when the switching brake B0 has been engaged at the present time, a determination is made of whether or not the number of engine revolutions will change.

When the number of revolutions ($N_s$) of the differential unit sun gear s0 has not become a number of revolutions '0', and so a NO determination was made in SG6, the routine moves to SG7, and synchronizing gearshifting of the continuously variable transmission unit 20 and the first electric motor M1 is performed.

Specifically, when the number of revolutions ($N_s$) of the differential unit sun gear s0 is higher than '0', while downshifting the continuously variable transmission unit 20 to increase the number of revolutions ($N_r$) of the differential unit ring gear r0, at the same time the number of revolutions ($N_s$) of the differential unit sun gear s0 is reduced with the first electric motor M1, thus performing control so that the number of revolutions ($N_s$) becomes '0'.

Conversely, when the number of revolutions ($N_s$) of the differential unit sun gear s0 is less than '0', while upshifting the continuously variable transmission unit 20 to decrease the number of revolutions ($N_r$) of the differential unit ring gear r0, at the same time the number of revolutions ($N_s$) of the differential unit sun gear s0 is increased with the first electric motor M1, thus performing control so that the number of revolutions ($N_s$) becomes '0'. In other words, when switching the differential limiting state of the differential unit 11 to the high side, the gear ratio of the continuously variable transmission unit 20 is set to a large deceleration ratio relative to a minimum deceleration ratio.

When the number of revolutions ($N_s$) of the differential unit sun gear s0 is '0', and so a YES determination was made in SG6, after control has been performed with SG7 so that the number of revolutions ($N_s$) of the differential unit sun gear s0 becomes '0', the routine moves to SG8. In SG8, a lock control (engaging operation) of the switching brake B0 is performed. When this engaging operation of the switching brake B0 is performed, the number of revolutions ($N_s$) of the differential unit sun gear s0 is already '0', so this switching operation can be smoothly performed, a shock that accompanies the engaging operation of the switching brake B0 can be avoided, and thus it is possible to avoid a worsening of drivability. Also, as described above, when switching the differential limiting state of the differential unit 11 to the low side, the gear ratio of the continuously variable transmission unit 20 is set to a small deceleration ratio relative to a maximum deceleration ratio, so in a region where the differential of the differential unit 11 is limited, it is possible to use the gear ratio of the continuously variable transmission unit 20 up to the maximum deceleration ratio. That is, it is possible to expand the maximum deceleration ratio side of the change width of the gear ratio of the continuously variable transmission unit 20 in the differential limiting state. Conversely, when switching the differential limiting state of the differential unit 11 to the high side, the gear ratio of the continuously variable transmission unit 20 is set to a large deceleration ratio relative to a minimum deceleration ratio, so in a region where the differential of the differential unit 11 is limited, it is possible to use the gear ratio of the continuously variable transmission unit 20 up to the minimum deceleration ratio. That is, it is possible to expand the minimum deceleration ratio side of the change width of the gear ratio of the continuously variable transmission unit 20 in the differential limiting state.

FIGS. 19A to 19D are timing charts that show the state of change of each of the number of engine revolutions, the number of revolutions of the differential unit ring gear R0, the number of revolutions of the first electric motor M1, and hydraulic pressure for engaging the switching clutch C0, when performing the engaging operation of the switching clutch C0 from a state in which the number of revolutions ($N_s$) of the differential unit sun gear S0 is higher than the number of revolutions ($N_r$) of the differential unit ring gear R0.

As shown in FIGS. 19A to 19D, at time T1, synchronizing gearshifting of the continuously variable transmission unit 20 and the first electric motor M1 is started. That is, without changing the number of engine revolutions, by gearshift control of the continuously variable transmission unit 20, the number of revolutions of the differential unit ring gear r0 is raised (downshifting the continuously variable transmission unit 20), and the number of revolutions of the first electric motor M1 is reduced, and thus, the number of revolutions ($N_s$) of the differential unit sun gear s0 is made to match the number of revolutions ($N_r$) of the differential unit ring gear r0. At time T2, when $N_s$ matches $N_r$, gearshift control of the continuously variable transmission unit 20 is stopped to stop changes in the number of revolutions of the differential unit ring gear R0, and at the same time, changes in the number of revolutions of the first electric motor M1 are also stopped. Afterward, at time T3, by increasing hydraulic pressure for engaging the switching clutch C0, the switching clutch C0 is operated to the engaging side, and at time T4, the engaging operation of the switching clutch C0 is completed.

Note that, although not illustrated in the above flowchart, when switching from the locked state to the differential state, after release of the switching clutch C0 or after release of the switching brake B0, revolution number control of the rotating elements (the differential unit sun gear S0, the differential unit carrier CA0, and the differential unit ring gear R0) of the differential unit 11 is gradually implemented to establish a predetermined gearshifting state. Also, here, the description assumes instant movement, so the number of engine revolutions is the same before and after control, but for example when the accelerator pedal is suddenly depressed or the like, the number of engine revolutions may be controlled so as to increase with time also during control.

Also when switching between a switching brake B0 engagement region and a switching clutch C0 engagement region in the region of high vehicle speed and high torque shown in FIG. 7, a gearshift operation of the continuously variable transmission unit 20 same as in the case described above is performed at the same time.

Third Embodiment

Figure 20:
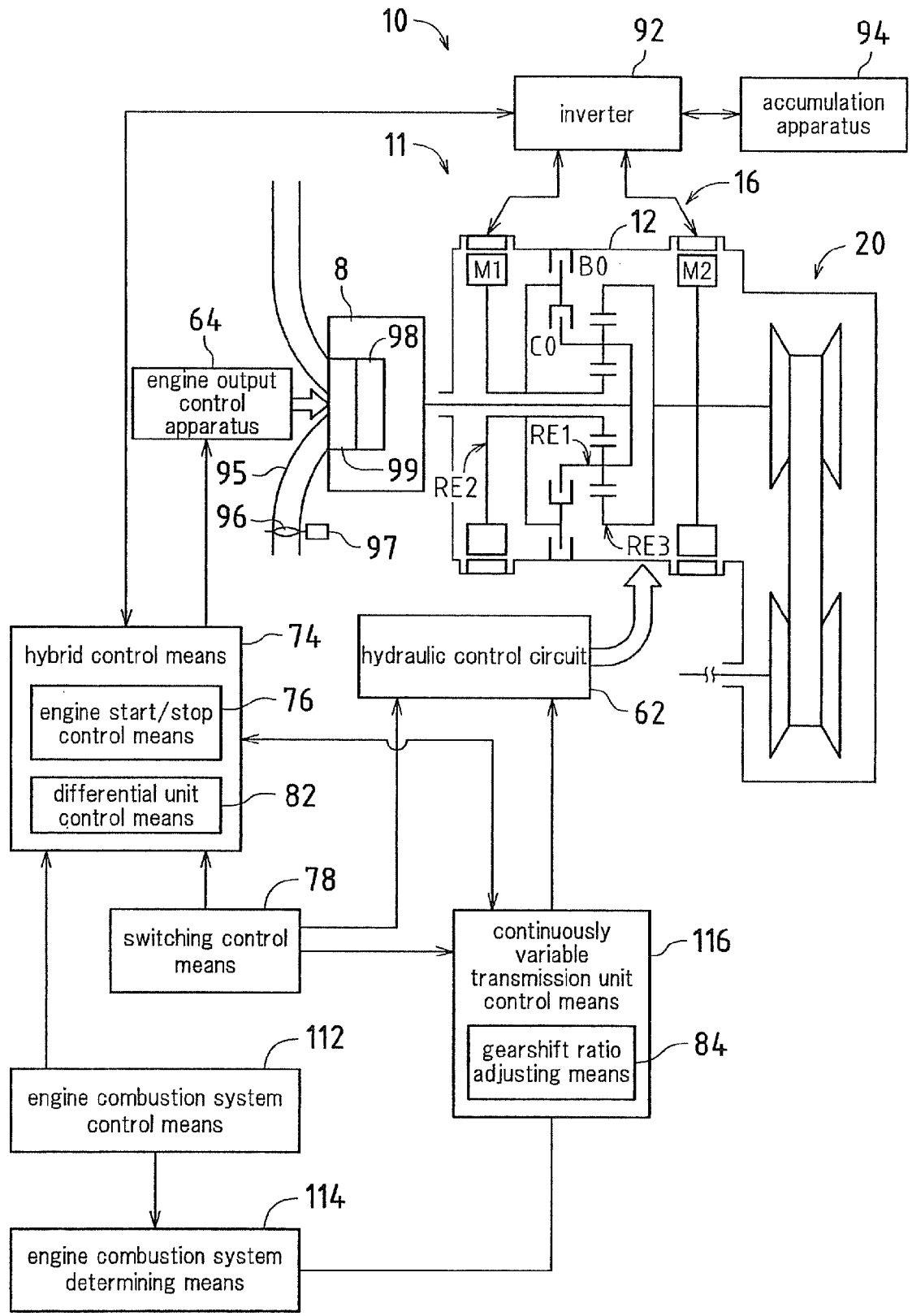
FIG. 20 is a functional block diagram that illustrates relevant parts of control functions of the electronic control apparatus of FIG. 3, in a third embodiment.

FIG. 20 is a functional block diagram that illustrates relevant parts of control functions of the electronic control apparatus 60, in a third embodiment. In FIG. 20, a continuously variable transmission unit control means 116 is substituted for the continuously variable transmission unit control means 80 in FIG. 5, which is a functional block diagram of the first embodiment, and FIG. 20 differs from FIG. 5 in that an engine combustion system control means 112 and an engine combustion system determining means 114 are added. Below, mainly the differing points will be described.

The engine 8 of this embodiment is provided with a plurality of combustion systems having different specific fuel consumption properties, namely a stoichiometric combustion system that burns a mixture having a theoretical air-fuel ratio and a lean combustion system that burns a mixture in which fuel is diluted from the theoretical air-fuel ratio. In this engine 8, a combustion system appropriate to the running state is adopted. The engine combustion system control means 112 of FIG. 20 estimates engine load from the throttle valve opening degree $\theta_{TH}$, the engine revolution speed $N_E$, and the like, and according to a condition that has been set in advance testing, switches the combustion system of the engine 8 to the stoichiometric combustion system according to the engine load or to the lean combustion system.

Figure 6:
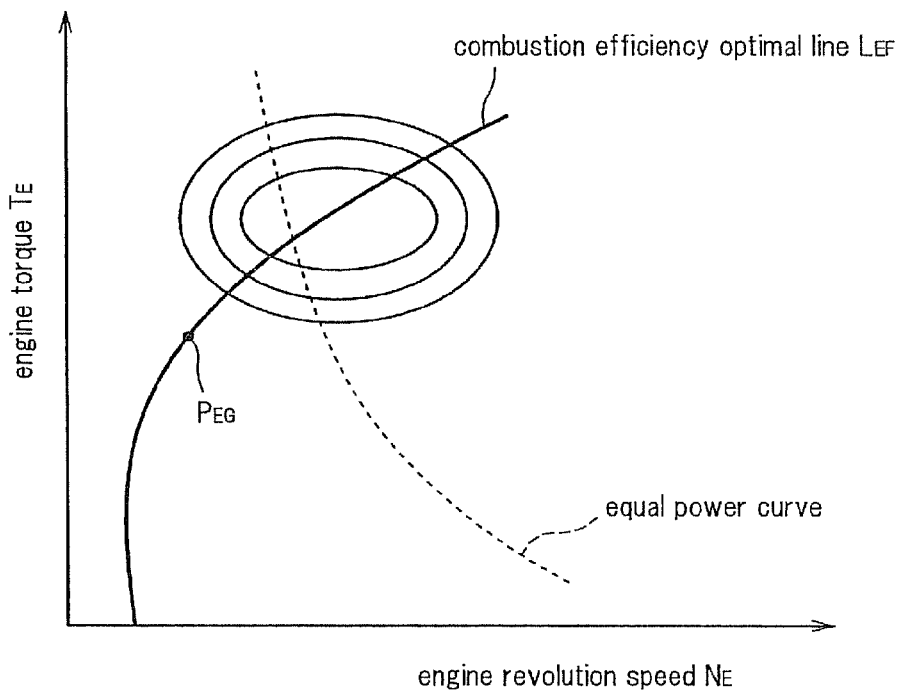
FIG. 6 shows a combustion efficiency optimal line of an engine linked to the hybrid vehicle drive apparatus of FIG. 1.
Figure 21:
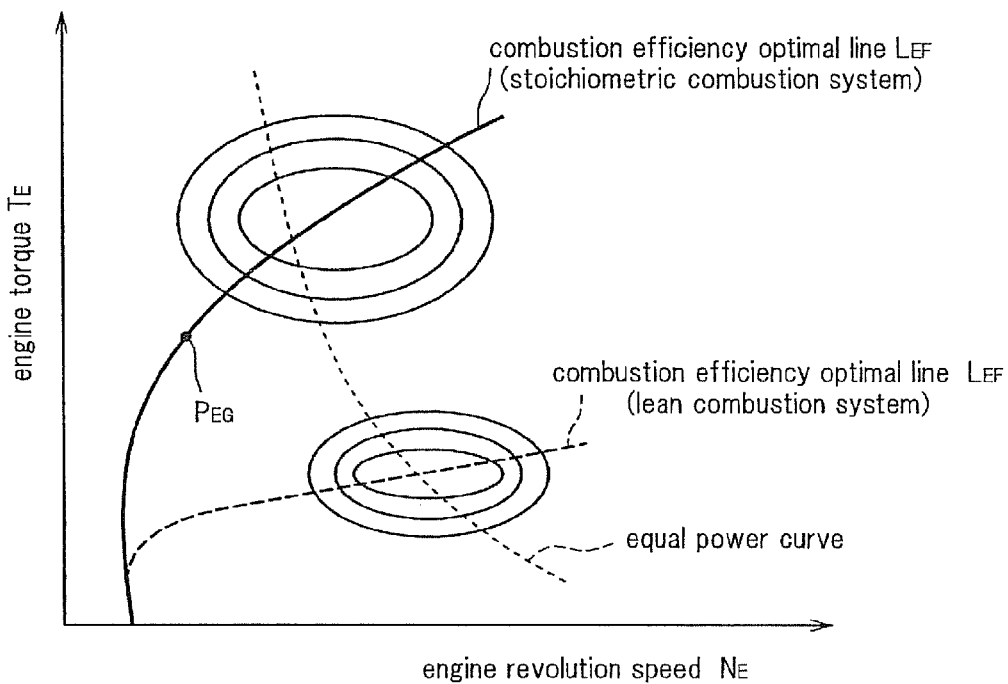
FIG. 21 shows a combustion efficiency optimal line of an engine linked to the hybrid vehicle drive apparatus of FIG. 1, in the third embodiment, and corresponds to FIG. 6 of the first embodiment.

Because the engine 8 of this embodiment is provided with a plurality of combustion systems, in the hybrid control means 74, not the combustion efficiency optimal line $L_{EF}$ shown in FIG. 6, but a combustion efficiency optimal line $L_{EF}$ (optimal specific fuel consumption rate curve $L_{EF}$, specific fuel consumption map) as in FIG. 21 according to the stoichiometric combustion system and the lean combustion system respectively is stored in advance. The hybrid control means 74, after selection of the combustion efficiency optimal line $L_{EF}$ according to the combustion system of the engine 8, in the same manner as in the first embodiment, controls the gear ratio γ0 of the differential unit 11 such that the engine 8 is operated along that selected combustion efficiency optimal line $L_{EF}$.

The engine combustion system determining means 114 determines whether the combustion system of the engine 8 is switched to the stoichiometric combustion system or to the lean combustion system.

The continuously variable transmission unit control means 116, like the continuously variable transmission unit control means 80 of the first embodiment, functions as a gearshift control means that performs gearshifting of the continuously variable transmission unit 20, and when the differential unit 11 is in the differential state (continuously variable gearshifting state) during engine running, determines (sets) and changes the gear ratio $\gamma_{CVT}$ of the continuously variable transmission unit 20 based on the vehicle speed V from the continuously variable transmission unit gear ratio map. However, with respect to the continuously variable transmission unit gear ratio map, when, as in the first embodiment, the gear ratio $\gamma_{CVT}$ is determined from the vehicle speed V according to that continuously variable transmission unit gear ratio map, and the engine 8 has been caused to operate at the engine operation point $P_{EG}$ on the combustion efficiency optimal line $L_{EF}$, ideally, the continuously variable transmission unit gear ratio map indicates the relationship of the vehicle speed V and the gear ratio $\gamma_{CVT}$ that have been obtained and set in advance testing such that the first electric motor revolution speed $N_{M1}$ becomes zero or substantially zero (the mechanical lock point). However, the engine 8 of this embodiment is provided with the stoichiometric combustion system and the lean combustion system, and there are a total of two combustion efficiency optimal lines $L_{EF}$ that respectively correspond to the stoichiometric combustion system and the lean combustion system, so FIG. 22, which is the continuously variable transmission unit gear ratio map used for determining the gear ratio $\gamma_{CVT}$ of the continuously variable transmission unit 20 and is stored in advance by the continuously variable transmission unit control means 116, is constituted from a total of two gear ratio curves corresponding to the respective combustion systems. This point differs from FIG. 8 (the first embodiment). When the gear ratio $\gamma_{CVT}$ of the continuously variable transmission unit 20 has been determined from this FIG. 22 continuously variable transmission unit gear ratio map, as in the collinearity diagram of FIG. 23 that indicates the relative revolution speed of the rotating elements RE1 to RE3, in either combustion system, without a change in the revolution speed of a fourth rotating element RE4 restricted by the vehicle speed V, ideally, the engine 8 is operated such that the first electric motor revolution speed $N_{M1}$ does not deviate from the mechanical lock point, and the engine revolution speed $N_E$ becomes different revolution speeds that correspond to the engine operation point $P_{EG}$ along the combustion efficiency optimal line $L_{EF}$ of the respective combustion systems.

Figure 22:
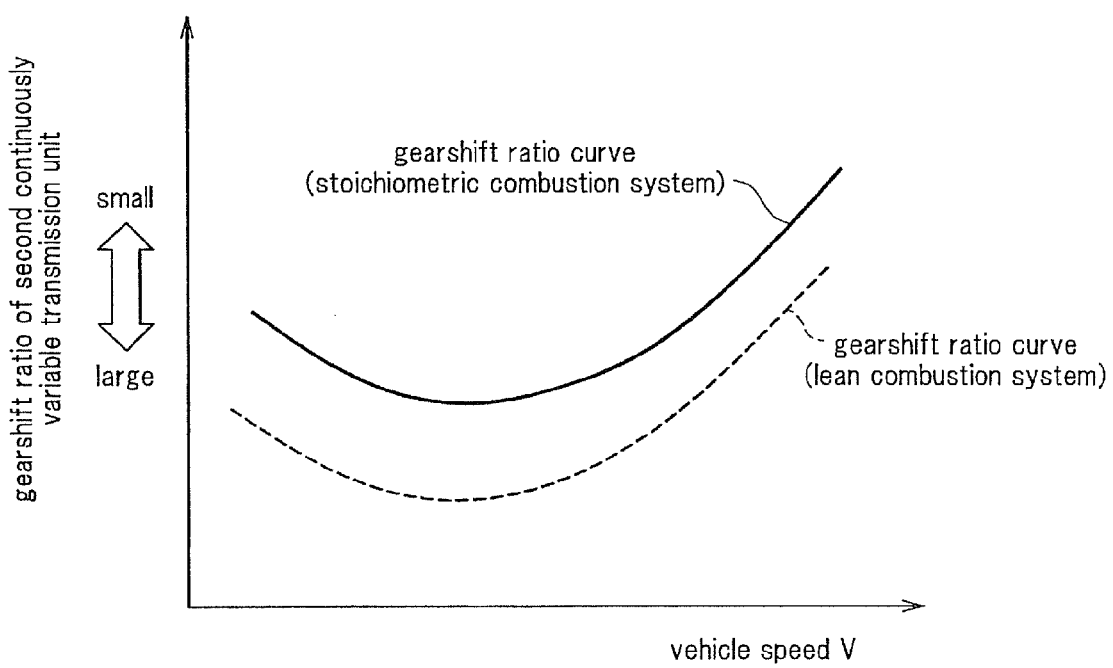
FIG. 22 is a continuously variable transmission unit gear ratio map, used by the continuously variable transmission unit control means in FIG. 20 to determine the basic gear ratio of the continuously variable transmission unit, that indicates the relationship between vehicle speed and the gear ratio of the continuously variable transmission unit, in the third embodiment, and corresponds to FIG. 8 of the first embodiment.
Figure 23:
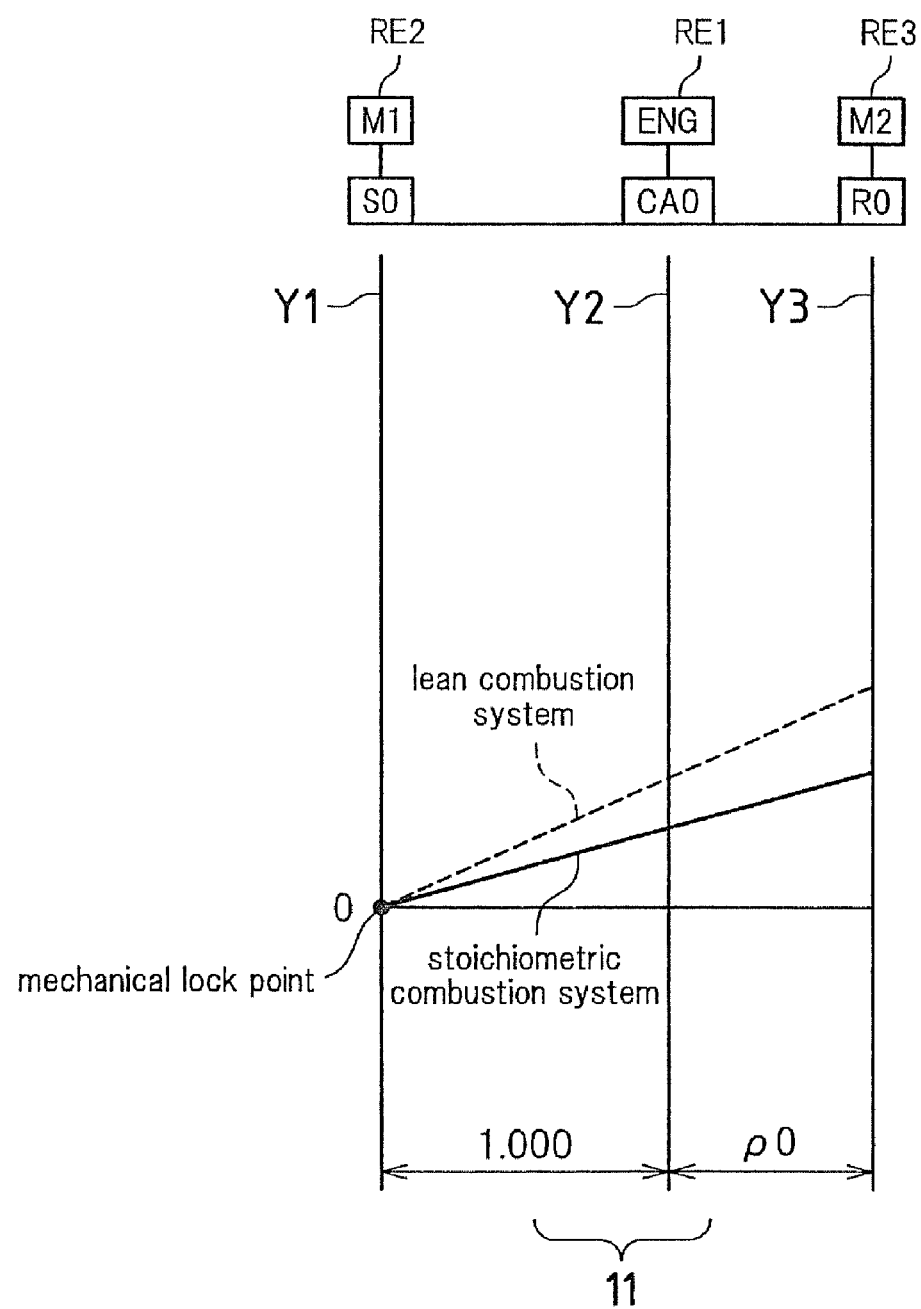
FIG. 23 is a collinearity diagram that shows an example of the relative relationship of the revolution speeds of rotating elements when the combustion system of the engine linked to the hybrid vehicle drive apparatus of FIG. 1 has been switched, in the third embodiment.

In this way, it is necessary for the continuously variable transmission unit control means 116 to select either of the two gear ratio curves according to the combustion system of the engine 8, so when the engine combustion system determining means 114 has determined that the engine 8 is switched to the stoichiometric combustion system, the continuously variable transmission unit control means 116 selects the gear ratio curve of the stoichiometric combustion system from the continuously variable transmission unit gear ratio map in FIG. 22, and so when the engine combustion system determining means 114 has determined that the engine 8 is switched to the lean combustion system, the continuously variable transmission unit control means 116 selects the gear ratio curve of the lean combustion system from the continuously variable transmission unit gear ratio map in FIG. 22. Then, the continuously variable transmission unit control means 116 determines (sets) the gear ratio $\gamma_{CVT}$ of the continuously variable transmission unit 20 based on the vehicle speed V and that selected gear ratio curve. In other words, because the selected gear ratio curve expresses the relationship of the vehicle speed V and the gear ratio $\gamma_{CVT}$ when the engine 8 has been caused to operate at the engine operation point $P_{EG}$ on the combustion efficiency optimal line $L_{EF}$ corresponding to the present combustion system, the continuously variable transmission unit control means 116 determines (sets) the gear ratio $\gamma_{CVT}$ of the continuously variable transmission unit 20 based on the combustion efficiency optimal line $L_{EF}$ corresponding to the present combustion system.

Figure 24:
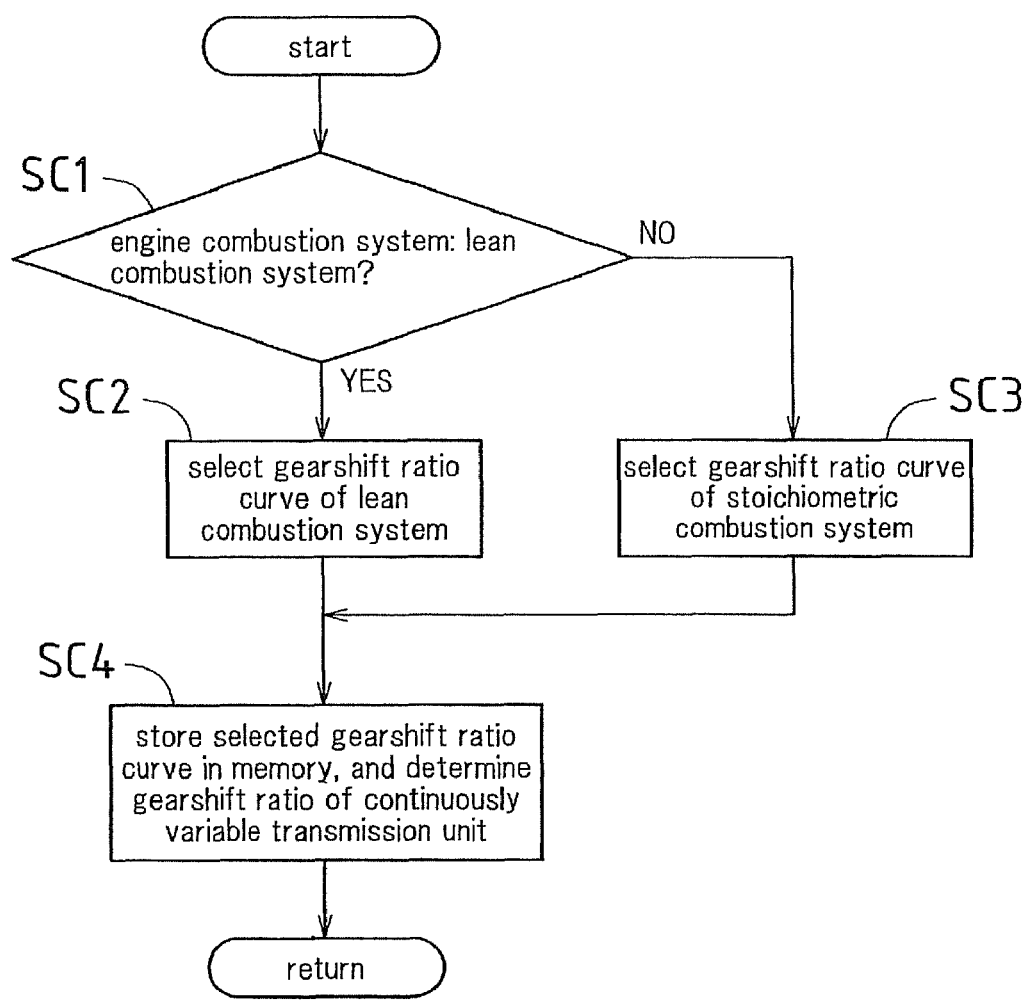
FIG. 24 is a flowchart that illustrates relevant parts of a control operation of the electronic control apparatus in FIG.

FIG. 24 is a flowchart that illustrates, in this embodiment, relevant parts of a control operation of the electronic control apparatus 60, i.e., a control operation for determining the gear ratio $\gamma_{CVT}$ of the continuously variable transmission unit 20 according to the combustion system of the engine 8 when the differential unit 11 is in a differential state (continuously variable gearshifting state) during engine running. This control operation is repeatedly executed with an extremely short cycle time of, for example, several milliseconds to several tens of milliseconds.

First, in SC1 corresponding to the engine combustion system determining means 114, a determination is made of whether or not the combustion system of the engine 8 is switched to the lean combustion system. When this determination is affirmative, i.e., when the combustion system of the engine 8 is switched to the lean combustion system, the routine moves to SC2. On the other hand, when this determination is negative, i.e., when the combustion system of the engine 8 is switched to the stoichiometric combustion system, the routine moves to SC3.

In SC2, the gear ratio curve of the lean combustion system is selected from the continuously variable transmission unit gear ratio map in FIG. 22. After SC2, the routine moves to SC4.

In SC3, the gear ratio curve of the stoichiometric combustion system is selected from the continuously variable transmission unit gear ratio map in FIG. 22. After SC3, the routine moves to SC4.

In SC4, the gear ratio curve selected in SC2 or SC3 is stored in a memory as the gear ratio curve for determining the basic gear ratio of the continuously variable transmission unit 20. Then, the gear ratio $\gamma_{CVT}$ of the continuously variable transmission unit 20 is determined based on that selected gear ratio curve and the vehicle speed V. Above SC2 to SC4 correspond to the continuously variable transmission unit control means 116.

According to the present embodiment, there is the following effect (B1) in addition to the effects (A-1) to (A-9) of the first embodiment.

(B-1) The continuously variable transmission unit control means 116 determines the gear ration $\gamma_{CVT}$ of the continuously variable transmission unit 20 based on the vehicle speed V and the gear ratio curve (see FIG. 22) selected according to the combustion system of the engine 8. That is, because the gear ration $\gamma_{CVT}$ of the continuously variable transmission unit 20 is determined based on the combustion efficiency optimal line $L_{EF}$ (see FIG. 21), even if the combustion system of the engine 8 is changed, the gear ration $\gamma_{CVT}$ of the continuously variable transmission unit 20 is determined (set) according to that combustion system, so the engine 8 is operated so as to realize optimal specific fuel consumption according to the respective combustion systems, and the transmission efficiency $\eta_{11}$ of the differential unit 11 improves, so it is possible to suppress a decrease in fuel efficiency of the vehicle as a whole.

Fourth Embodiment

FIG. 25 is a skeleton diagram that illustrates the drive apparatus 10 of a fourth embodiment. FIG. 25 differs from FIG. 1, which is a skeleton diagram of the first embodiment, in that the continuously variable transmission unit 20 that is a belt-driven CVT transmission apparatus is replaced by a continuously variable transmission unit 140 that is a toroidal CVT transmission apparatus. Below, mainly the differing points will be described. The functional block diagrams and flowcharts of the present embodiment are the same as those of the first embodiment.

The drive apparatus 10 in FIG. 25 is preferably used in an FR (front engine/rear drive)-type vehicle, in which the engine is placed lengthwise in a hybrid vehicle. The continuously variable transmission unit 140 is a so-called toroidal CVT transmission apparatus that functions as a continuously variable automatic transmission that can continuously change the gear ratio $\gamma_{CVT}$ by mechanical action. This continuously variable transmission unit 140 is provided with two input disks 142a and 142b (referred to below as 'input disks 142' when not particularly necessary to distinguish between the input disks 142a and 142b) that are linked to the transmission member 18 and face each other on the rotational axis thereof, two output disks 144a and 144b (referred to below as 'output disks 144' when not particularly necessary to distinguish between the output disks 144a and 144b) that are provided coaxially between the two input disks 142a and 142b and respectively face the input disks 142a and 142b, and are linked to the output shaft 22, and a total of four power rollers 146a, 146b, 146c, and 146d (referred to below as 'power rollers 146' when not particularly necessary to distinguish between the individual power rollers) that are provided between the respective input disks 142a and 142b and the output disks 144a and 144b that face each other, in groups of two and with the rotational axis of the input disks 142 and the output disks 144 as a symmetry axis. The input disks 142 and the output disks 144 that face each other are pressed in the direction that they approach each other, their opposing faces, while generating frictional force, contact the outer circumferential face of two of the power rollers 146, being provided therebetween, and have a rotational axis that intersects the rotational axis of the transmission member 18, and the contact face with the power rollers 146 that face the input disks 142 and the output disks 144 has a circular cross-section such that the rotational axis of the power roller 146 can oscillate while maintaining that contact. In the continuously variable transmission unit 140 configured in this manner, one group including the input disk 142a, the power rollers 146a and 146b, and the output disk 144a that forms a first motive power transmission path, and one group including the input disk 142b, the power rollers 146c and 146d, and the output disk 144b that forms a second motive power transmission path are, as a mechanical arrangement, provided in series on the rotational axis of the transmission member 18, and are provided in parallel as motive power transmission paths. Drive torque that has been input from the transmission member 18 is transmitted to the respective input disks 142, power rollers 146, and output disks 144 in this order in two parallel moving transmission paths in the continuously variable transmission unit 140, and is transmitted to the drive wheels 38 via the output shaft 22 linked to the output disks 144.

In the continuously variable transmission unit 140, by changing an angle $\theta_{PR}$ (see FIG. 25) formed by the rotational axis of the power rollers 146 that make frictional contact at the outer circumferential with the respective input disks 142 and output disks 144 and the rotational axis of the transmission member 18, to the same angle with the four power rollers 146 simultaneously, the ratio of the radius (effective diameter) of the contact point of the input disks 142 with the power rollers 146 to the radius (effective diameter) of the contact point of the output disks 144 with the power rollers 146 changes, and thus the gear ratio $\gamma_{CVT}$ of the continuously variable transmission unit 20 continuously changes. Specifically, as the angle $\theta_{PR}$ is made smaller, the radius of the contact point of the input disks 142 increases, so the radius of the contact point of the output disks 144 decreases, and thus the gear ratio $\gamma_{CVT}$ of the continuously variable transmission unit 20 decreases.

According to the present embodiment, only the mechanical structure of the continuously variable transmission unit 140 differs from the first embodiment, so the same effects as effects (A1) to (A9) of the first embodiment are obtained.

Other Embodiments

Above, embodiments of the present invention were described in detail based on the drawings, but these are only exemplary embodiments, and the invention can be embodied in a form having various modifications and improvements added based on the knowledge of a person having ordinary skill in the art.

For example, in the above third embodiment, a case was described in which the combustion system of the engine 8 is changed, but the invention is compatible not only with a case in which the combustion system of the engine 8, which is an operation system of the engine 8, is changed, but using a similar control operation to that above, is also compatible with a case in which another operation system is changed. For example, using a similar control operation to that above, the invention is also compatible with an engine 8 provided with a variable cylinder operation system, such as in which the engine 8 is driven with four cylinders under a light load and is driven with eight cylinders under a heavy load.

Also, in the above third embodiment, the combustion system of the engine 8 includes two systems, a lean combustion system and a stoichiometric combustion system, but the combustion system of the engine 8 may also include three or more systems.

Also, in the above first to fourth embodiments, by controlling the operation state of the first electric motor M1, the differential unit 11 (power distribution mechanism 16) functions as an electric continuously variable transmission in which the gear ratio $\gamma 0$ is allowed to change continuously from a minimum value $\gamma 0min$ to a maximum value $\gamma 0max$, but for example, the gear ratio $\gamma 0$ of the differential unit 11 may also be changed not continuously, but in steps using a differential action. The continuously variable transmission units 20 and 140 also may change their gear ratio $\gamma_{CVT}$ in steps.

Also, in the above first to fourth embodiments, the engine 8 and the differential unit 11 are directly linked, but the engine 8 may be linked to the differential unit 11 via an engaging element such as a clutch or the like.

Also, in the above first to fourth embodiments, the first electric motor M1 and the second rotating element RE2 are directly linked, and the second electric motor M2 and the third rotating element RE3 are directly linked, but the first electric motor M1 may be linked to the second rotating element RE2 via an engaging element such as a clutch or the like, and the second electric motor M2 linked to the third rotating element RE3 via an engaging element such as a clutch or the like.

Also, in the above first to fourth embodiments, in the motive power transmission path from the engine 8 to the drive wheels 38, the continuously variable transmission unit 20 is linked after the differential unit 11, but an order may be adopted in which the transmission unit 11 is linked after the continuously variable transmission unit 20. In other words, the continuously variable transmission unit 20 may be provided so as to constitute part of the motive power transmission path from the engine 8 to the drive wheels 38.

Also, in the above first to fourth embodiments, according to FIG. 1, the differential unit 11 and the continuously variable transmission unit 20 are linked in series, but the invention is also applicable when the differential unit 11 and the continuously variable transmission unit 20 are not independent, as long as an electric differential function in which the drive apparatus 10 as a whole can be electrically changed to a differential state, and a function in which gearshifting is performed by a different principle from the gearshifting by that electric differential function, are provided.

Also, in the above first to fourth embodiments, the power distribution mechanism 16 is a single planetary mechanism, but may also be a double planetary mechanism.

Also, in the above first to fourth embodiments, the engine 8 is linked to the first rotating element RE1 that constitutes the differential unit planetary gear apparatus 24 so as to be capable of motive power transmission, the first electric motor M1 is linked to the second rotating element RE2 so as to be capable of motive power transmission, and the motive power transmission path to the drive wheels 38 is linked to the third rotating element RE3, but the invention is also applicable to a configuration in which, for example, in a configuration in which two planetary gear apparatuses are linked to each other by some of the rotating elements that constitute those planetary gear apparatuses, an engine, an electric motor, and drive wheels are linked to the respective planetary gear apparatus rotating elements so as to be capable of motive power transmission, and by control of a clutch or brake linked to those planetary gear apparatus rotating elements, the differential unit 11 can be switched between stepped gearshifting and continuously variable gearshifting.

Also, in the above first to fourth embodiments, the second electric motor M2 is directly linked to the transmission member 18, but the link position of the second electric motor M2 is not limited thereto; the second electric motor M2 may be directly linked to the motive power transmission path from the engine 8 or the transmission member 18 to the drive wheels 38, or may be intermittently linked via a transmission, a planetary gear apparatus, an engaging apparatus, or the like.

Also, in the power distribution mechanism 16 of the above first to fourth embodiments, the differential unit carrier CA is linked to the engine 8, the differential unit sun gear S0 is linked to the first electric motor M1, and the differential unit ring gear R0 is linked to the transmission member 18, but those link relationships are not limited to such a configuration. The engine 8, the first electric motor M1, and the transmission member 18 may be linked to any of the three elements CA0, S0, and R0 of the differential unit planetary gear apparatus 24.

Also, in the above first to fourth embodiments, the engine 8 is directly linked to the input shaft 14, but the engine 8 may be operationally linked via a gear or a belt, for example, and it is not necessary for the engine 8 and the input shaft 14 to be disposed on a common axis.

Also, in the above first to fourth embodiments, the first electric motor M1 and the second electric motor M2 are disposed concentric to the input shaft 14, and the first electric motor M1 is linked to the differential unit sun gear S0 and the second electric motor M2 is linked to the transmission member 18, but this arrangement is not absolutely necessary. For example, a configuration may be adopted in which the first electric motor M1 is operationally linked to the differential unit sun gear S0 via a gear, a belt, a reduction gear, or the like, and the second electric motor M2 is linked to the transmission member 18.

Also, in the above first to fourth embodiments, the power distribution mechanism 16 is configured from the one differential unit planetary gear apparatus 24, but may also be configured from two or more planetary gear apparatuses, and in the non-differential state (fixed gearshifting state) may function as a transmission having three gears or more.

Also, in the above first to fourth embodiments, the second electric motor M2 is linked to the transmission member 18 that constitutes a part of the motive power transmission path from the engine 8 to the drive wheels 38, but a configuration may also be adopted in which, in addition to the second electric motor M2 being linked to that motive power transmission path, the second electric motor M2 is made linkable to the power distribution mechanism 16 via an engaging element such as a clutch, and the differential state of the power distribution mechanism 16 can be controlled with the second electric motor M2 instead of the first electric motor M1.

Also, each of the plurality of embodiments described above can be implemented in combination with each other with a priority ranking.

Furthermore, the present invention may be embodied in various other forms without departing from the gist or essential characteristics thereof.

What is claimed is:

1. A control apparatus of a vehicle drive apparatus, comprising:
    an electric differential unit in which a differential state between a number of revolutions of an input shaft and a number of revolutions of an output shaft is controlled by controlling an operation state of a first electric motor linked to a rotating element of a differential mechanism;
    a limited slip differential means that is capable of limiting the differential state of the differential mechanism;
    a motive power source linked to the input shaft;
    a continuously variable transmission unit that constitutes a part of a motive power transmission path; and
    a gear ratio adjusting means that, when a differential of the electric differential unit is limited by the limited slip differential means, sets an operation point of the motive power source by adjusting a gear ratio of the continuously variable transmission unit relative to a target output of the motive power source, and when the differential of the electric differential unit is not limited, sets the operation point of the motive power source by adjusting an overall gear ratio obtained from the gear ratio of the electric differential unit and the gear ratio of the continuously variable transmission unit relative to the target output of the motive power source.

2. The control apparatus of a vehicle drive apparatus according to claim 1, wherein the gear ratio adjusting means is configured to adjust the gear ratio such that the operation point of the motive power source approximately conforms to a point at which specific fuel consumption is optimal.

3. The control apparatus of a vehicle drive apparatus according to claim 1, further comprising a second electric motor linked to the electric differential unit;
    wherein when the differential of the electric differential unit is limited, the target output of the motive power source is set assuming that electricity is generated by the second electric motor.

4. The control apparatus of a vehicle drive apparatus according to claim 1, further comprising a second electric motor linked to the electric differential unit;
    wherein when the differential of the electric differential unit is not limited, the target output of the motive power source is set assuming that electricity is generated by the first electric motor and the second electric motor.

5. The control apparatus of a vehicle drive apparatus according to claim 1,
    wherein a second electric motor for generating running drive power is provided in the motive power transmission path, and
    when running by driving of only the second electric motor, a state is established in which differential operation of the electric differential unit is possible.

6. The control apparatus of a vehicle drive apparatus according to claim 1,
    wherein the differential mechanism is configured from a planetary gear apparatus, and
    the electric differential unit includes a second electric motor that is capable of transmitting motive power to one or more drive wheels.

7. The control apparatus of a vehicle drive apparatus according to claim 1, wherein the gear ratio adjusting means is configured to, during the switching transition between the state that limits the differential of the electric differential unit and the state that does not limit the differential of the electric differential unit, change the gear ratio of the electric differential unit and the gear ratio of the continuously variable transmission unit at approximately the same time, such that the number of revolutions of the motive power source does not change.

8. The control apparatus of a vehicle drive apparatus according to claim 1, further comprising a switching control means that, based on a vehicle running condition, switches between a state that limits the differential of the electric differential unit and a state that does not limit the differential of the electric differential unit.

9. The control apparatus of a vehicle drive apparatus according to claim 8, wherein the switching control means, based on vehicle speed as the vehicle running condition, switches between a state that limits the differential of the electric differential unit and a state that does not limit the differential of the electric differential unit.

10. The control apparatus of a vehicle drive apparatus according to claim 8, wherein the switching control means, based on accelerator opening degree as the vehicle running condition, switches between a state that limits the differential of the electric differential unit and a state that does not limit the differential of the electric differential unit.

11. The control apparatus of a vehicle drive apparatus according to claim 1, wherein as the state in which the differential of the electric differential unit is limited by the limited slip differential means, it is possible to switch between two states, low and high, that have a different gear ratio of the electric differential unit.

12. The control apparatus of a vehicle drive apparatus according to claim 11, further comprising a low/high switching control means that performs low/high switching of the differential limiting state of the electric differential unit based on vehicle speed.

13. The control apparatus of a vehicle drive apparatus according to claim 11, further comprising a low/high switching control means that performs low/high switching of the differential limiting state of the electric differential unit based on accelerator opening degree.

14. The control apparatus of a vehicle drive apparatus according to claim 1,
wherein the gear ratio adjusting means is configured to, when limiting the differential of the electric differential unit, change the gear ratio of the continuously variable transmission unit such that an overall gear ratio is not changed.

15. The control apparatus of a vehicle drive apparatus according to claim 14,
wherein as the state in which the differential of the electric differential unit is limited by the limited slip differential means, it is possible to switch between two states, low and high, that have a different gear ratio of the electric differential unit, and
the gear ratio adjusting means is configured to, when switching the differential limiting state of the electric differential unit to the low side, set the gear ratio of the continuously variable transmission unit to a small deceleration ratio relative to a maximum deceleration ratio.

16. The control apparatus of a vehicle drive apparatus according to claim 14,
wherein as the state in which the differential of the electric differential unit is limited by the limited slip differential means, it is possible to switch between two states, low and high, that have a different gear ratio of the electric differential unit, and
the gear ratio adjusting means is configured to, when switching the differential limiting state of the electric differential unit to the high side, set the gear ratio of the continuously variable transmission unit to a large deceleration ratio relative to a minimum deceleration ratio.

17. A control apparatus of a vehicle drive apparatus, comprising:
an electric differential unit in which a differential state between a number of revolutions of an input shaft and a number of revolutions of an output shaft is controlled by controlling an operation state of a first electric motor linked to a rotating element of a differential mechanism;
a limited slip differential that is capable of limiting the differential state of the differential mechanism;
a motive power source linked to the input shaft;
a continuously variable transmission unit that constitutes a part of a motive power transmission path; and
a gear ratio adjuster that, when a differential of the electric differential unit is limited by the limited slip differential, sets an operation point of the motive power source by adjusting a gear ratio of the continuously variable transmission unit relative to a target output of the motive power source, and when the differential of the electric differential unit is not limited, sets the operation point of the motive power source by adjusting an overall gear ratio obtained from the gear ratio of the electric differential unit and the gear ratio of the continuously variable transmission unit relative to the target output of the motive power source.

18. The control apparatus of a vehicle drive apparatus according to claim 17, wherein the gear ratio adjuster is configured to adjust the gear ratio such that the operation point of the motive power source approximately conforms to a point at which specific fuel consumption is optimal.

19. The control apparatus of a vehicle drive apparatus according to claim 17, further comprising a second electric motor linked to the electric differential unit;
wherein when the differential of the electric differential unit is limited, the target output of the motive power source is set assuming that electricity is generated by the second electric motor.

20. The control apparatus of a vehicle drive apparatus according to claim 17, further comprising a second electric motor linked to the electric differential unit;
wherein when the differential of the electric differential unit is not limited, the target output of the motive power source is set assuming that electricity is generated by the first electric motor and the second electric motor.

* * * * *